United States Patent
Hilgers et al.

(10) Patent No.: US 8,887,087 B2
(45) Date of Patent: Nov. 11, 2014

(54) COLUMN LAYOUT

(75) Inventors: Peer Hilgers, St. Leon-Rot (DE); Leif Jensen-Pistorius, Oestringen (DE)

(73) Assignee: SAP SE, Walldorf (DE)

( * ) Notice: Subject to any disclaimer, the term of this patent is extended or adjusted under 35 U.S.C. 154(b) by 1254 days.

(21) Appl. No.: 11/692,334

(22) Filed: Mar. 28, 2007

(65) Prior Publication Data

US 2008/0244422 A1    Oct. 2, 2008

(51) Int. Cl.
*G06F 17/00*    (2006.01)
*G06F 3/048*    (2013.01)
*G06F 3/041*    (2006.01)
*G06F 9/44*    (2006.01)

(52) U.S. Cl.
CPC .................................. *G06F 9/4443* (2013.01)
USPC ............ 715/788; 715/238; 715/762; 715/799

(58) Field of Classification Search
CPC . G06T 11/60; G06F 17/211; G06F 17/30905; G06F 17/212
USPC .................................. 715/238, 788, 762, 799
See application file for complete search history.

(56) References Cited

U.S. PATENT DOCUMENTS

| | | | | |
|---|---|---|---|---|
| 6,380,940 | B1 * | 4/2002 | Halstead et al. ........... | 345/469.1 |
| 6,389,437 | B2 * | 5/2002 | Stoub ............. | 715/201 |
| 6,583,794 | B1 * | 6/2003 | Wattenberg ................... | 715/708 |
| 6,694,487 | B1 * | 2/2004 | Ilsar .............. | 715/247 |
| 6,760,048 | B1 * | 7/2004 | Bates et al. .................... | 715/797 |
| 6,915,484 | B1 * | 7/2005 | Ayers et al. ................... | 715/234 |
| 7,028,258 | B1 * | 4/2006 | Thacker et al. .............. | 715/209 |
| 7,177,488 | B2 * | 2/2007 | Berkner et al. ............... | 382/298 |
| 7,191,390 | B2 * | 3/2007 | Williamson et al. .......... | 715/251 |
| 7,216,302 | B2 * | 5/2007 | Rodden et al. ................ | 715/815 |
| 7,313,765 | B2 * | 12/2007 | Taylor et al. .................. | 715/788 |
| 7,370,284 | B2 * | 5/2008 | Andrea et al. ................ | 715/788 |
| 7,475,333 | B2 * | 1/2009 | Otter et al. .................... | 715/222 |
| 7,487,444 | B2 * | 2/2009 | Lira .............................. | 715/247 |
| 7,512,876 | B2 * | 3/2009 | Endo et al. .................... | 715/227 |
| 7,750,924 | B2 * | 7/2010 | Berker et al. ................. | 345/619 |
| 7,880,752 | B2 * | 2/2011 | Torimoto et al. ............. | 345/667 |
| 8,135,616 | B2 * | 3/2012 | Callaghan et al. .......... | 705/14.46 |
| 8,464,177 | B2 * | 6/2013 | Ben-Yoseph et al. ......... | 715/800 |

(Continued)

OTHER PUBLICATIONS

"Cascading Style Sheets, level 2 revision 1 CSS 21. Speciification", W3C Working Draft Nov. 6, 2006,4 pgs.

(Continued)

*Primary Examiner* — Jordany Nunez
(74) *Attorney, Agent, or Firm* — Schwegman, Lundberg & Woessner, P.A.

(57) ABSTRACT

In one embodiment, a method is illustrated as including displaying an editing window, the editing window being a Graphical User Interface (GUI) used to design an application interface, associating a User Interface (UI) element with a layout element, and generating metadata, the metadata containing data illustrating the association between the UI element and the layout element. Further, another embodiment is illustrated as including receiving a service request relating to an application, the service request including a first set of rendering data illustrating a display area within which a first GUI relating to the application will be displayed, retrieving metadata, the metadata illustrating layout elements and associated UI elements relating to the first GUI, retrieving display logic associated with the metadata, retrieving business logic associated with the metadata, and generating the first GUI, wherein the first GUI is generated using the metadata, display logic and business logic.

13 Claims, 20 Drawing Sheets

(56) References Cited

U.S. PATENT DOCUMENTS

| | | | |
|---|---|---|---|
| 8,527,907 B2* | 9/2013 | Goshey | 715/863 |
| 2002/0180800 A1* | 12/2002 | Taylor et al. | 345/788 |
| 2003/0004836 A1* | 1/2003 | Otter et al. | 705/27 |
| 2003/0128234 A1* | 7/2003 | Brown et al. | 345/744 |
| 2003/0222921 A1 | 12/2003 | Rummel | |
| 2003/0222922 A1 | 12/2003 | Rummel | |
| 2004/0114814 A1* | 6/2004 | Boliek et al. | 382/233 |
| 2004/0189716 A1* | 9/2004 | Paoli et al. | 345/853 |
| 2004/0237040 A1* | 11/2004 | Malkin et al. | 715/526 |
| 2005/0108655 A1* | 5/2005 | Andrea et al. | 715/798 |
| 2005/0229157 A1* | 10/2005 | Johnson | 717/114 |
| 2006/0107231 A1* | 5/2006 | Matthews et al. | 715/788 |
| 2006/0168506 A1* | 7/2006 | Endo et al. | 715/500.1 |
| 2006/0212825 A1* | 9/2006 | Taylor et al. | 715/788 |
| 2006/0259859 A1* | 11/2006 | Ivarsoy et al. | 715/520 |
| 2007/0214431 A1* | 9/2007 | Amadio et al. | 715/788 |
| 2013/0125050 A1* | 5/2013 | Goshey | 715/800 |
| 2013/0139098 A1* | 5/2013 | Lira | 715/781 |

OTHER PUBLICATIONS

"The CSS table model", (Retrieved Apr. 2, 2007), 26 pgs.

\* cited by examiner

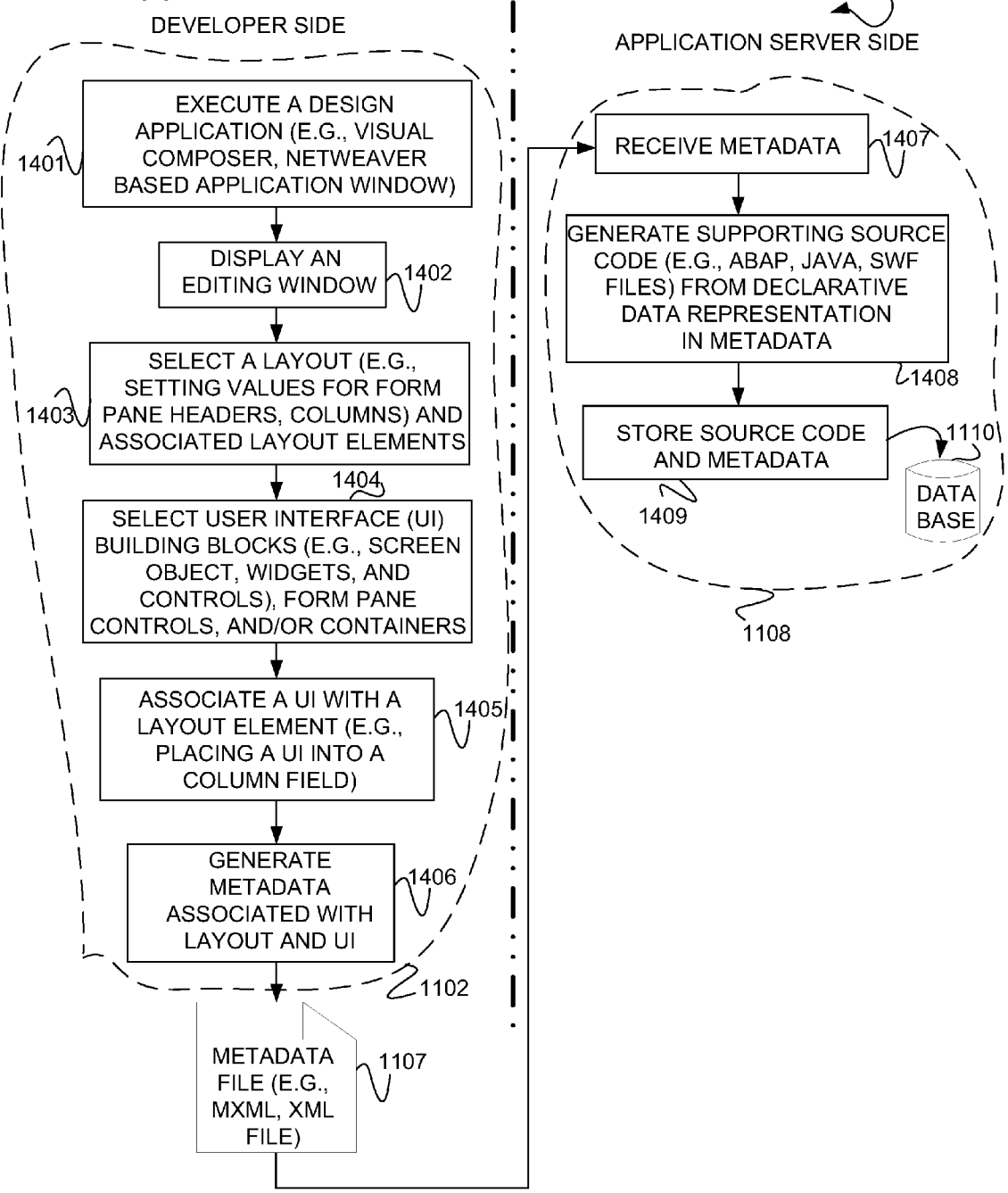

COLUMN LAYOUT

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2007, SAP AG, All Rights Reserved.

TECHNICAL FIELD

The present application relates generally to the technical field of algorithms and programming and, in one specific example, to the optimization of a Graphical User Interface (GUI).

BACKGROUND

GUIs come in many forms and can be used to facilitate user interaction with, for example, a distributed computing environment (e.g., a web based application) or an application residing wholly on a single computer system (e.g., a stand-alone application). Common to these GUIs is the association of certain functionality with specific regions of the GUI. This functionality may be illustrated to the user via, for example, various screen objects or widgets.

BRIEF DESCRIPTION OF THE DRAWINGS

Some embodiments are illustrated by way of example and not limitation in the figures of the accompanying drawings in which:

FIG. 14 is a dual stream flowchart illustrating a method used to generate a display area and associated UI and layout elements, according to an example embodiment.

DETAILED DESCRIPTION

Figure 1:
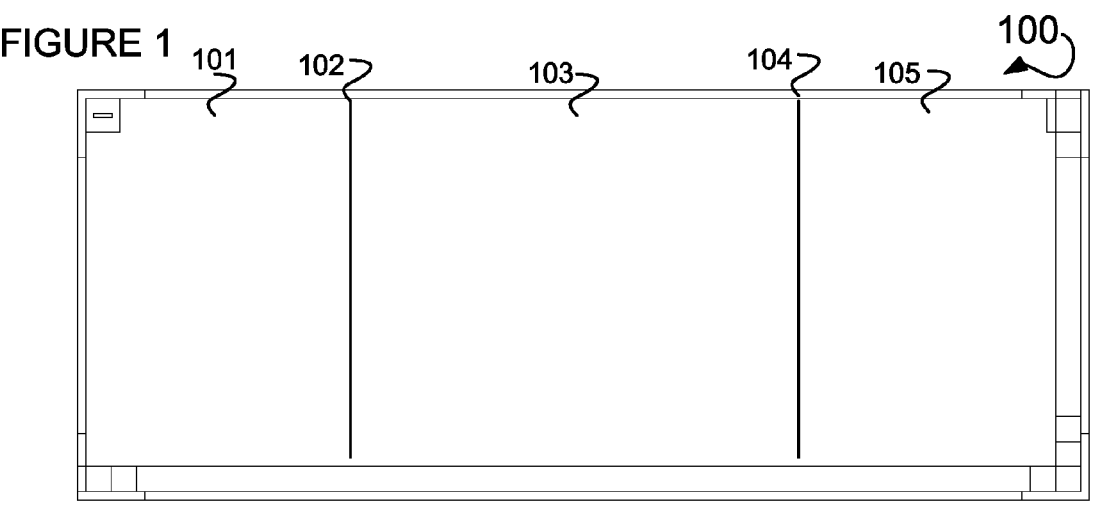
FIG. 1 is a two-dimensional diagram illustrating a display area containing a number of layout elements including columns, according to an example embodiment.

In the following description, for purposes of explanation, numerous specific details are set forth to provide a thorough understanding of an embodiment of the present invention. It may be evident, however, to one skilled in the art that the present invention will be practiced without these specific details.

The leading digit(s) of reference numbers appearing in the Figures generally corresponds to the Figure number in which that component is first introduced, such that the same reference number is used throughout to refer to a component appearing in multiple Figures. Signals and connections may be referred to by the same reference number or label, and the actual meaning will be clear from its use in the context of the description.

In some embodiments, a system and method is illustrated is to allow users to apply certain principles of declarative programming in the positing or repositioning of UI elements and layout elements within the display area of a GUI. Specifically, rather than a user (e.g., a software developer) having to generate the layout and supporting business logic to position or reposition a UI or layout element, a user may just associate the UI element and layout element such that issues relating to how to align certain UI elements within an associated layout element may be automatically addressed. For example, if a display area is expanded, than certain UI and layout elements may be automatically repositioned to fill the newly available space created by the expansion. If, on the other hand, the display area is reduced, then the UI and layout elements may be automatically repositioned to fill what available space may exist to accommodate these UI and layout elements. This automatic repositioning has applications where the available space within a display area may be limited (e.g., the screens of hand held devices etc.) Further, this positioning or repositioning may include the repositioning of labels associated with a UI or layout element.

Other features may be apparent from the accompanying drawings and from the detailed description that follows.

In some embodiments, certain principles of declarative programming are implemented wherein a layout, residing as a part of a GUI, is divided into various discrete regions through the use of layout elements (e.g., columns, grids, tab strip containers, and form panes). Into these layout elements are placed certain screen object and widgets (collectively referred to as UI elements), each having a particular functionality. By placing these UI elements into a layout element, the UI element is effectively associated with the layout element. The placement of these UI elements is facilitated through the use of, for example, an input device such as a mouse, track ball, or other suitable device that may, for example, facilitate the use of a drag-and-drop feature associated with such an input device. The association of the UI elements and layout elements effectively creates a GUI with certain functionality. This GUI may then be executed as an interface for an application (e.g., a browser based or stand-alone application).

In some cases, groups of UI elements are associated with layout elements. These groups may be containers that include, for example, form pane headers, labels, fields, buttons, text views, melting groups, check boxes, radio buttons, drop down list boxes, and/or any UI elements that have a height of an input field or smaller (e.g., rating indicator, progress indicator etc.). Through using these containers, groups of functionality can be associated with a layout element, as opposed to only associating individual UI elements with a layout element. In some cases, individual UI elements will only be associated with certain layout elements, such that only certain containers (e.g., a collection of screen objects or widgets referenced herein as form pane controls) will be associated with certain UI elements. For example, where five columns are placed into a layout, columns one, two, and five may be reserved for use with form pane controls, while columns three or four may be reserved for the use with specific UI elements. Additionally, in some embodiments, various regions (e.g., a space that may or may not be occupied by layout element) in a layout may be reserved for labels (e.g., if a layout were divided into seven regions, then only regions one, four, and seven may be available for labels). And again, example embodiments may include various regions in a layout that may only contain panes that, in turn, have UI elements (e.g., if a layout were divided into seven regions, then only regions one, four, and seven may be available for panes containing UI elements). Further, in some cases, multiple UI elements may be treated as one UI element.

In some embodiments, containers may help to facilitate the interaction between, for example, various form pane controls. These containers may be placed into a layout and may be associated with one or more columns to form, for example, a tab strip container that spans from a first column to a second column. This tab strip container may have one or more layers of form pane controls that may be access through, for example, one or more UI elements (e.g., tabs). This layering may be further reflected in the layering of a column on top of a tab strip container, where the column may or may not be associated with this tab strip container.

Common to each layout element and UI element are certain values used, in some cases, to provide a size measurement for the layout element and UI element relative to the display area upon which it appears. In some embodiments, these values may include a relative percentage value (e.g., a relative percentage value approach) denoting the available space within a layout element that a particular UI element may occupy. Some example embodiments may include a What You See Is What You Get (WYSIWYG) approach (e.g., a WYSIWYG approach), wherein static values are used to determine the association of a UI element and a layout element. The values used to determine these relative percentage values, and/or static values may include pixels, and/or characters (e.g., referenced herein as "units"). In some cases the relative percentage value approach and static approach may be used in combination.

In one example, a display area may measure 350 units in height and 750 units in width (total area 262500 units), while a layout element, such as a column, contained within this display area may measure 700 units in height and 100 units in width (total area 70000 units). Associated with this column (e.g., contained within this column) may be any number of UI elements. These UI elements may each be a text box, radio button, scroll down menu, a graphic (e.g., a Joint Photographic Experts Group (JPEG) object), or some other suitable UI element. As with the layout element, these UI elements also use a certain amount of space. For example, a text box may take up an area of 50 units in width and 10 units in height (total area 500 units). In certain cases, the layout element associated with the UI element may have its dimensions changed such that its dimensions may become smaller or larger.

In some cases, the dimensions of a layout element may be changed, such that the UI elements associated with this layout element may be negatively affected in terms of their ability to facilitate functionality. For example, if the width of the above referenced layout element (e.g., the column) was reduced from 100 units to 40 units, then a text box associated with this layout element (e.g., the above illustrated text box taking up an area of 50 units in width) may fall outside the width of this layout element. In some cases, this may result in the UI element not fully rendering in the display area. In other cases, as alluded to above, this may result in the UI element not being able to use its full functionality. For example, where a text box did not fully render on a screen, it may not be able to receive input. The reduction in size may be effectuated through the used of an input devices (e.g., a mouse, trackball, or other suitable device) to reduce the size of a display area or layout element. This may be considered a problem of truncation.

In other cases, the dimensions of a layout may be increased such that an excessive amount of space exists for a UI element and its association with a layout element. For example, a layout element may be expanded from having a width of 200 units and a height of 200 units (total area 40000 units), to having a width of 400 units and a height of 400 units (total area 160000 units). Where an associated UI element has a width of 50 units and 20 units in height (total area 1000 units), such an increase may result in wasted available space. The increase may be effectuated through the used of an input devices (e.g., a mouse, trackball or other suitable device) to increase the size of a display area or layout element. This may be considered a problem of excessive available space.

Where truncation or excessive available space exists, a relative percentage value approach, and/or a WYSIWYG approach may be used as a basis upon which to reposition, for example, a UI element. In some embodiments, a relative percentage value is defined wherein a UI element may be allowed to only occupy some predefined percentage (e.g., a predefined minimum percentage) of the total area of the associated layout element. For example, if a layout element has an area of 150000 units (500 units*300 units), and the predefined minimum percentage is 5%, then the associated UI element may only be allowed to have an area of 7500 units (e.g., 75 units*100 units). If the area of the layout element is reduced and this minimum percentage value violated (e.g. the UI elements takes up an area of 7% due to the reduction in size of the layout element), then the UI element may be associated with a second layout element that does have an area available to accommodate the UI element. The association with the second layout element may involve the repositioning of the UI element within the second layout element such that, for example, the UI element is moved from a first column to a second column. Further, this relative percentage value approach may require that during repositioning of the UI element that a certain alignment of the UI element and it associated label be observed (e.g., all UI elements and labels be uniformly aligned).

In some embodiments, a problem of excessive available space may be addressed through associating the UI element with a new layout element, such that the UI element is repositioned to fill the excessive available space created by the expansion of one or more layout elements. For example, if a layout element has an area of 150000 units (500 units*300 units), and the predefined minimum that the UI element can take up is 5%, then any reduction in this predefined minimum (e.g., the layout area is increased to 200,000 units and then the ratio becomes 4%) requires the UI element to be repositioned such that the UI element can again meet its 5% requirement. In this example, this predefined minimum may be construed as a predefined maximum value.

Some example embodiments may include the use of a WYSIWYG approach to address the problem of truncation or excessive available space. Specifically, in certain instances the association of UI element from some point that is part of the layout element may be used to determine if repositioning is necessary. For example, if a container possessing various form pane controls is set (e.g., static values generated) to be oriented 10 characters from a particular side of a layout element (e.g., a column) and the column is expanded in size such that the container is 20 characters from the side, then the form pane controls may need to be repositioned and associated with another layout element. If this column is reduced in size, then repositioning may also need to take place.

Further, in some cases, the dimensions of a layout may change as a result of the device upon which the GUI is displayed. For example, a first monitor may have a viewing area of 1024 units by 1024 units, while a second monitor may have a viewing area of 780 units by 480 units. A GUI effectively displayed on the first monitor may not be effectively displayed on the second monitor. That is, while the functionality of a UI element appearing on the first monitor may be effectively accomplished with the requisite amount of space, this same functionality may be not be effectively accomplished within viewing area of the second monitor. Repositioning of the UI elements may be required.

Repositioning may be limited by issues relating to the type of layout elements involved. For example, in some embodiments, certain UI elements may only be associated (e.g., an association requirement) with certain layout elements such that where repositioning is necessary this association requirement must be observed. These association requirements may, in some embodiments, be determining during the designing of an application GUI.

Further, in some embodiments, repositioning may be based upon a notion of proportionality. Specifically, a UI element may only be repositioned where the repositioning allows for the UI element to be reposition such that the UI element takes up some type of predefined relative percentage value relative to other UI or layout elements. The notion of proportionality will be more fully illustrated below.

Example Layouts

FIG. 1 is a two-dimensional diagram illustrating an example display area 100, containing a number of layout elements including columns. For example, a column 101 is illustrated along with a column 103 and column 105. Separating the column 101 and column 103 is a border 102. Similarly, separating the column 103 and column 105 is a border 104. This display area 100 is, in some ways, a trivial example for it only includes one type of layout element (e.g., columns 101, 103, and 105). As will be shown more fully below, additional types of layout elements may also be used in lieu of columns, or in combination with columns.

Figure 2:
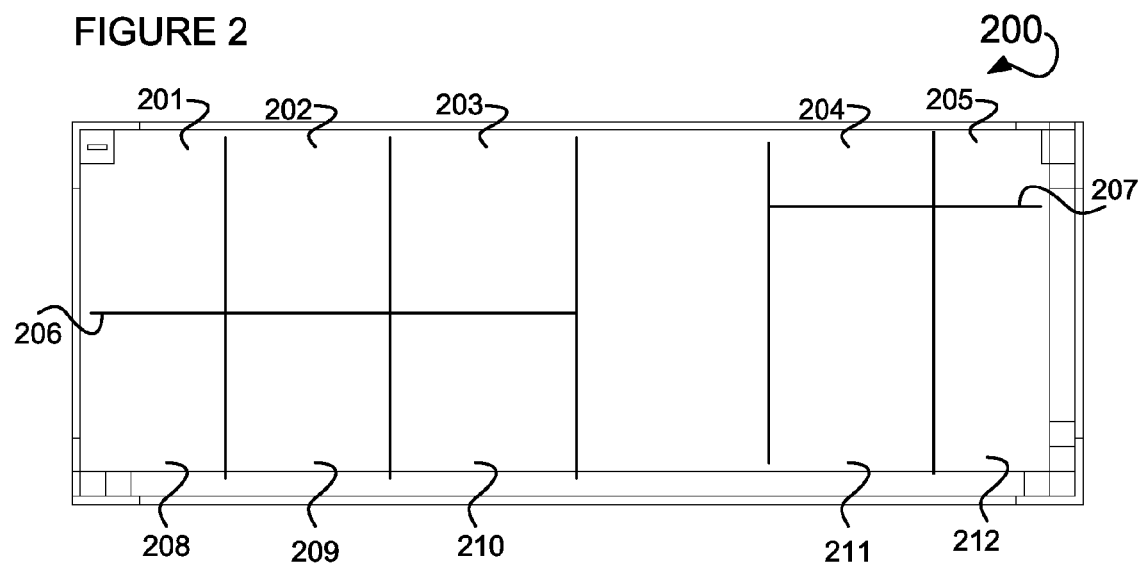
FIG. 2 is a two-dimensional diagram of a display area illustrating various types of layout elements including columns and containers, according to an example embodiment.

FIG. 2 is a two-dimensional diagram of an example display area 200 illustrating various types of layout elements including columns and containers. Illustrated are various columns (e.g., 201-205 and 208-212) and containers as denoted by borders 206 and 207. In certain cases, as will be more fully illustrated below, containers are used in lieu of or in addition to columns as a type of layout element. These containers are responsible for organizing the display area and for facilitating interaction between, for example, form pane controls and even in some cases, individual UI elements.

Figure 3:
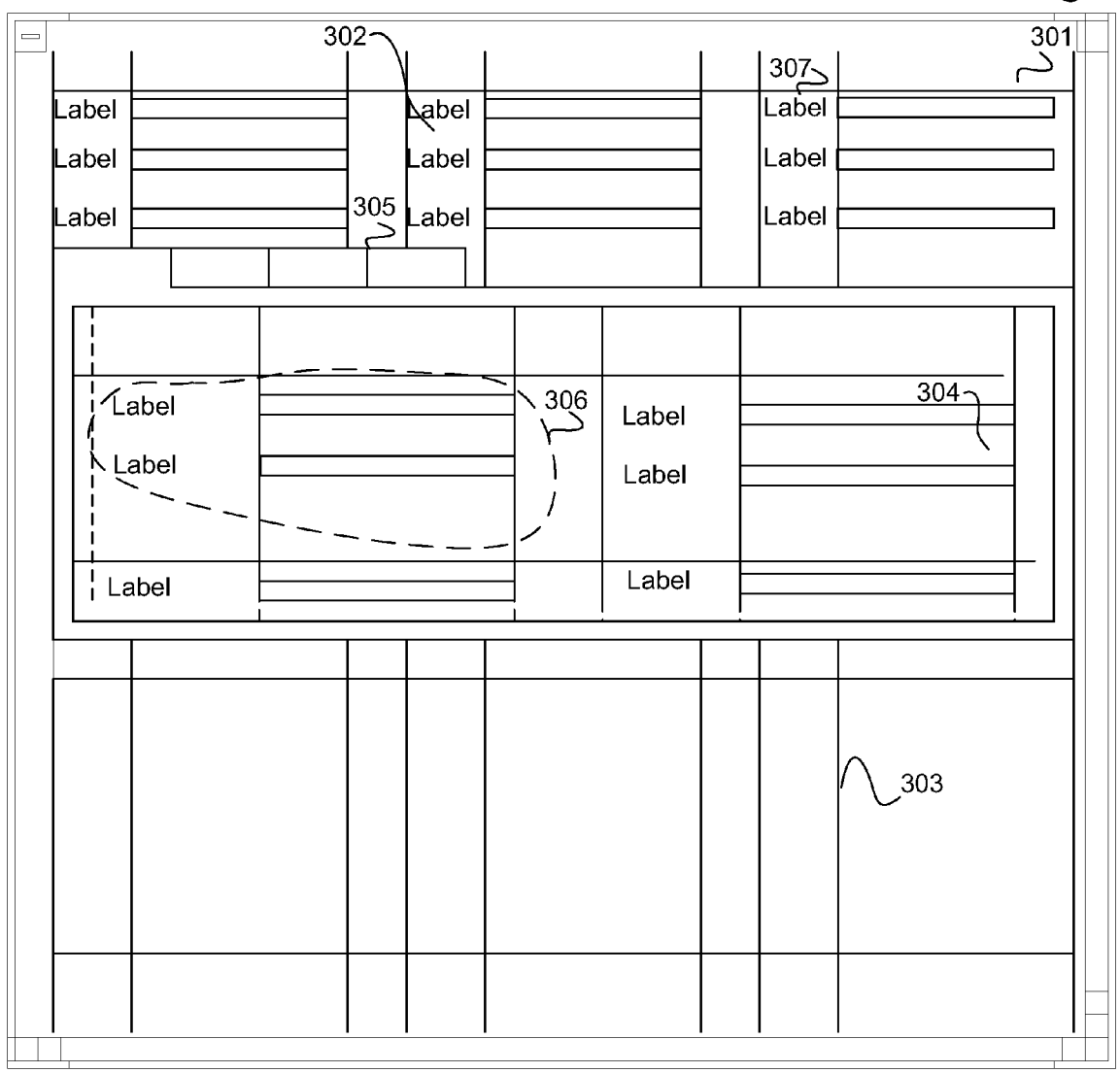
FIG. 3 is a user interface diagram illustrating a display area having a variety of layout elements associated with various UI elements including a column that contains a number of UI elements (e.g., textboxes), according to an example embodiment.

FIG. 3 is an example display area 300 illustrating the use of a variety of layout elements in association with various UI elements. Illustrated is a column 301 that contains a number of UI elements 307 which, in this case, are textboxes. Additionally illustrated is a form pane header 302, a type of UI element. This form pane header 302, in some cases, may be placed into a column or otherwise associated with the column. Additional types of layout elements include tab strip containers such as 305 and nested columns such as 304. In the case of nested columns, these types of layout elements may, in some cases, be placed and associated with a tab strip container such as 305. Further illustrated is an additional form pane control 306, which is a pane that contains a number of UI elements that are associated with it. Here, the form pane controls 306 contain two textboxes with accompanying labels. Additionally illustrated is another pane container 303. This pane container 303 here is placed at the bottom of the display area 300.

Display area 300, in many ways, represents a sophisticated example of the use of UI elements in combination with layout elements. This sophistication can include, for example, the layering of multiple layout elements such that one layout element will be placed upon another. This layering effect is illustrated with, for example, the nested column 304 that is placed on top of, or layered on top of, the tab strip container 305. In some cases, the tab strip container 305 may contain a plurality of layers where each layer may be accessed via a tab.

Figure 4:
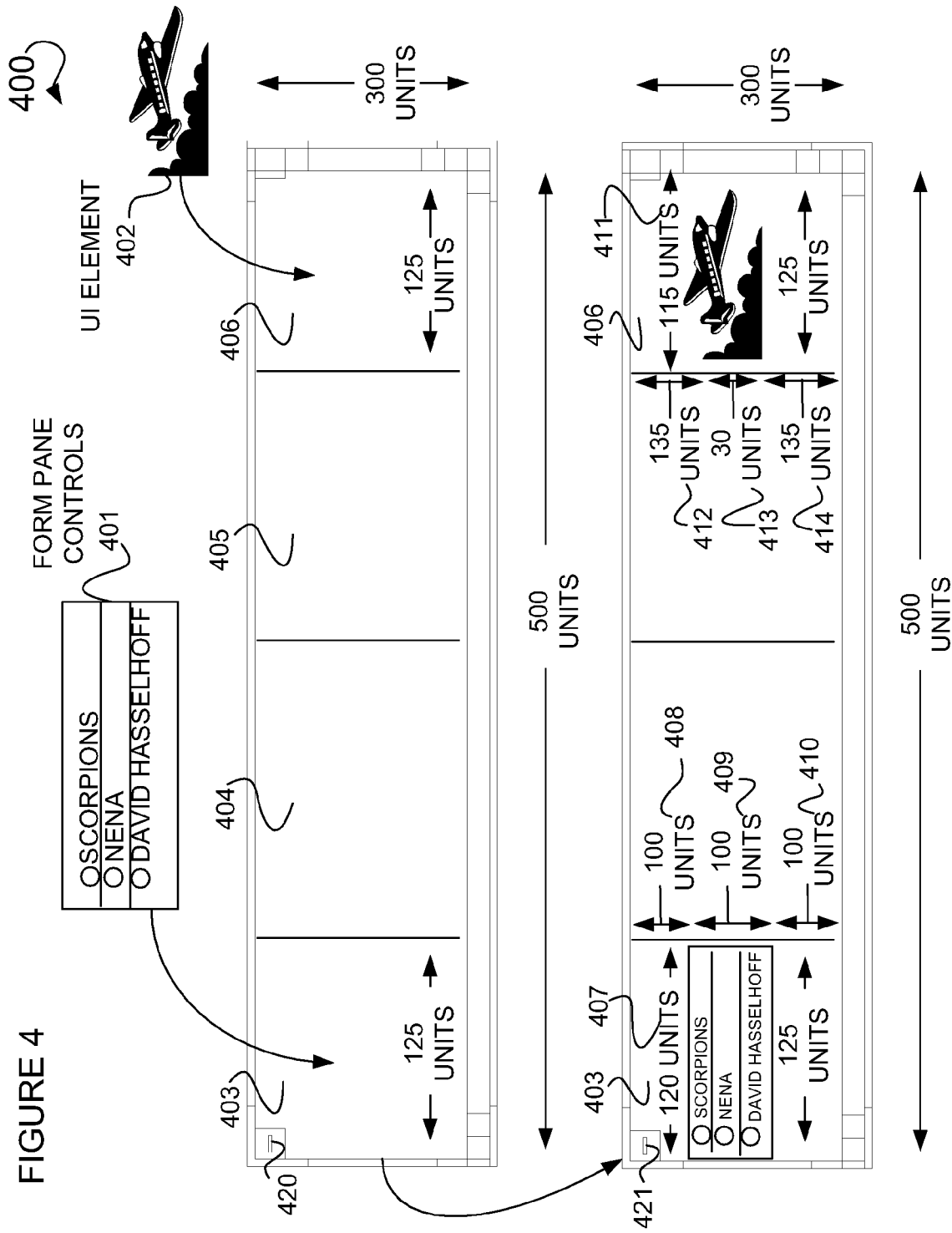
FIG. 4 is an interface sequence diagram illustrating a method used to associate one or more UI elements with one or more layout elements, according to an example embodiment.

FIG. 4 is an interface sequence diagram of an example method 400 used to associate one or more UI elements with one or more layout elements. Illustrated are a first UI element in the example form of a form pane control 401 and a second UI element in the form of a graphic 402. This display area 420 contains various columns (e.g., 403-406). Each of these columns is 125 units in width and 300 units in height, whereas the display area 420 is 500 units in width and 300 units in height. Illustrated is the insertion of the form pane controls 401 into the area denoted by column 403. Also illustrated is the insertion of the UI element 402 into the column denoted by the area 406. By inserting each of these UI elements (e.g., 401 and 402) into the various columns, an association is generated between these UI elements and the layout elements (e.g., columns 403 and 406). This association between the form pane control 401 and the column 403 is illustrated in display area 421.

The association between the form pane control 401 and the column 403 may be understood as an association between the two. Form pane control 401 is 120 units (e.g., 407) in width and approximately 100 units (e.g., 409) in height (total area 12000 units). In cases where a UI element is associated with a layout element, an association is generated whereby the UI element is oriented to or with various aspects of the layout element. Here, for example, a space of approximately 100 units (e.g., 408) exists between the top of the form pane control 401 and the top of the column 403. Similarly, a space exists between the bottom of the form pane control 401 and the bottom of the column 403 as denoted by 410. This association between the form pane control 401 and the column 403 is used, in some cases, to render the form pane control on the display area 421.

This same association is also used in the case of the UI element 402 graphic. As illustrated in column 406, the UI element 402 is associated with a column 406 such that the UI element 402 takes up 115 units of width and 30 units of height (total area of 3450 units) of the column 406. This UI element 402 is oriented such that a space of 135 units (e.g., 412) exists between the top of the UI element 402 and top of the column 406. Further, a space of 135 units (e.g., 414) exists between the bottom of the UI element 402 and the bottom of the column 406.

In some embodiments, the area that the UI element takes up within, for example, a layout element (e.g., column 403 or 406) is used to address the problem of truncation or additional space. Here, for example, the form pane control 401 takes up an area of 12000 units within the column 403. If, for example, the display area 420 were reduced or expanded in size, the form pane control 401 may need to be repositioned. This repositioning may be based upon the aforementioned relative percentage value approach, and/or a WYSIWYG approach.

Figure 5:
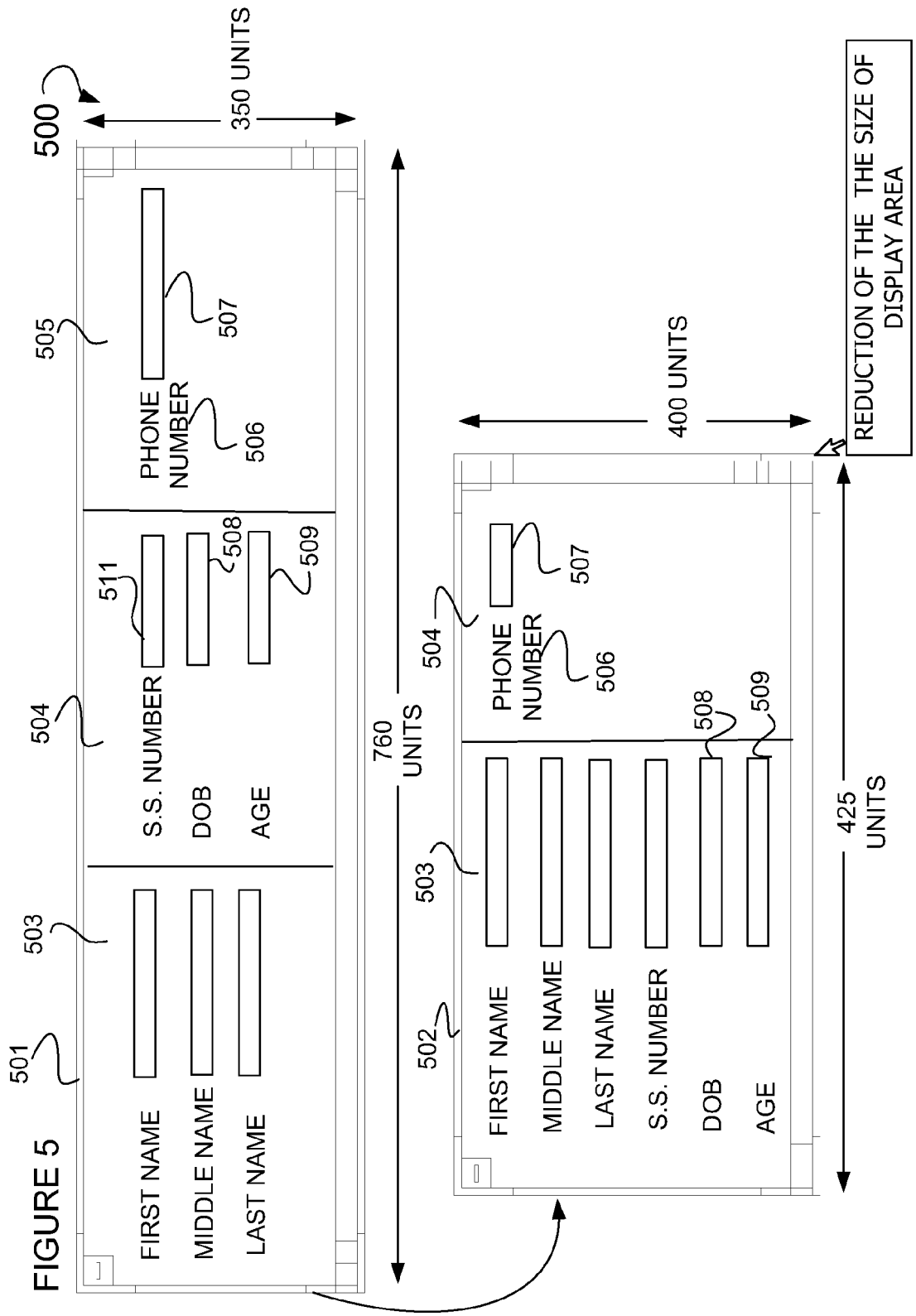
FIG. 5 is an interface sequence diagram illustrating a method used to reduce the size of the display area, according to an example embodiment.

FIG. 5 is an interface sequence diagram of an example method 500 used to reduce the size of the display area. Illustrated is a display area 501 divided by columns 503, 504, and 505. Associated with each one of these columns are various UI elements. For example, a UI element 508, in the form of a textbox and related label, is associated with column 504. Further, a UI element 509, in the form of a textbox and connected label, is also associated with column 504. Moreover, a UI element 507, in the form of a textbox and its accompanying label 506, is associated with column 505. Also illustrated is a display area 502 that serves to reflect the display area 501, as it might appear after it is reduced in size. For example here, the display area 502 is reduced in size such that instead of having three columns (e.g., layout elements), it now has two. These two columns are the previously illustrated as columns 503 and 504. In cases where a display area is reduced in size, the UI elements that are contained within a display area may be repositioned such that no UI elements may be truncated (e.g., problem of truncation) or otherwise lost. In the present example, the UI elements 508 and 509 are repositioned from being associated with the column 504 to being associated with the column 503. Similarly, the UI element 507 and its accompanying label 506, are repositioned to be associated with the column 504. This repositioning of UI element 507 and its accompanying label 506 may be necessary where the column 505 is truncated or otherwise eliminated due to the reduction size of the display area 501.

Some embodiments may include the observing of a certain alignment by the repositioned UI elements. For example, in some cases, a UI element and its associated label may be repositioned. Where this repositioning occurs, the UI elements may be uniformly aligned (e.g., adjusted right, left, or center), as may be their labels. This alignment may to be based upon a relative percentage values such that only a certain percentage of space may be taken up by a UI and/or its labels.

Figure 6:
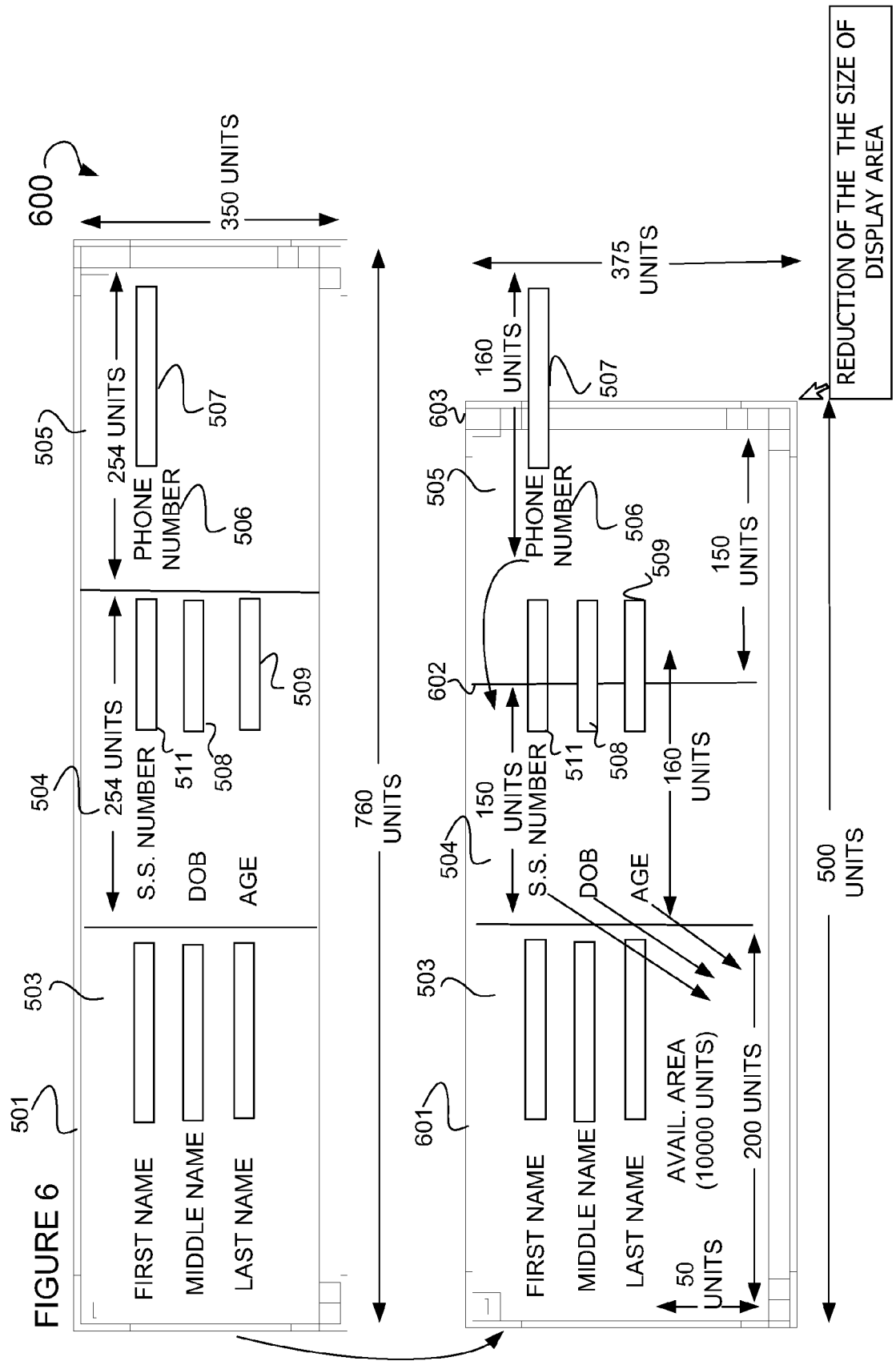
FIG. 6 is an interface sequence diagram illustrating a method to reposition various UI elements, according to an example embodiment.

FIG. 6 is an interface sequence diagram of an example method 600 illustrating the repositioning of various UI elements based upon the relative percentage, and/or a WYSIWYG approach. Illustrated is the previously illustrated display area 501 containing a number of UI elements and layout elements (e.g., 503-509). Where the display 501 is reduced in size, the various UI elements associated with various layout elements (e.g., columns 503-505) must be repositioned due to the truncation of the display area 501. For example, the display area 601 shows the actual repositioning of the various UI elements (e.g., 507, 508, 509, and 511). Illustrated is the width in terms of units of each of the UI elements 507, 508, 509, and 511 where, for example, the UI element 509 has a width of 160 units, whereas the UI element 507 has a width of 160 units. In this example, the display area 501 is reduced in size such that absent the repositioning of, for example, the UI element 507, the UI element 507 would be unable to be functional for the layout element (e.g., column 505) with which it is associated and is truncated, if not eliminated. Accordingly, in cases where truncation occurs, the UI element may be repositioned or associated with a layout element that can still allow it to function effectively. Here for example, the UI elements 508, 509, and 511 are repositioned and associated with the layout element 503 in the form of a column. Similarly, the UI element 507 is repositioned to be associated with the layout element 504. In cases where repositioning occurs, not only is the UI element (e.g., 508, 509, and 511) repositioned, but its accompanying label is also repositioned (e.g., "DOB", "AGE", and "S.S. NUMBER"), as this label may be considered to be a part of the UI element. In some cases, however, the label may not be considered as a part of the UI element and may not be repositioned.

Figure 7:
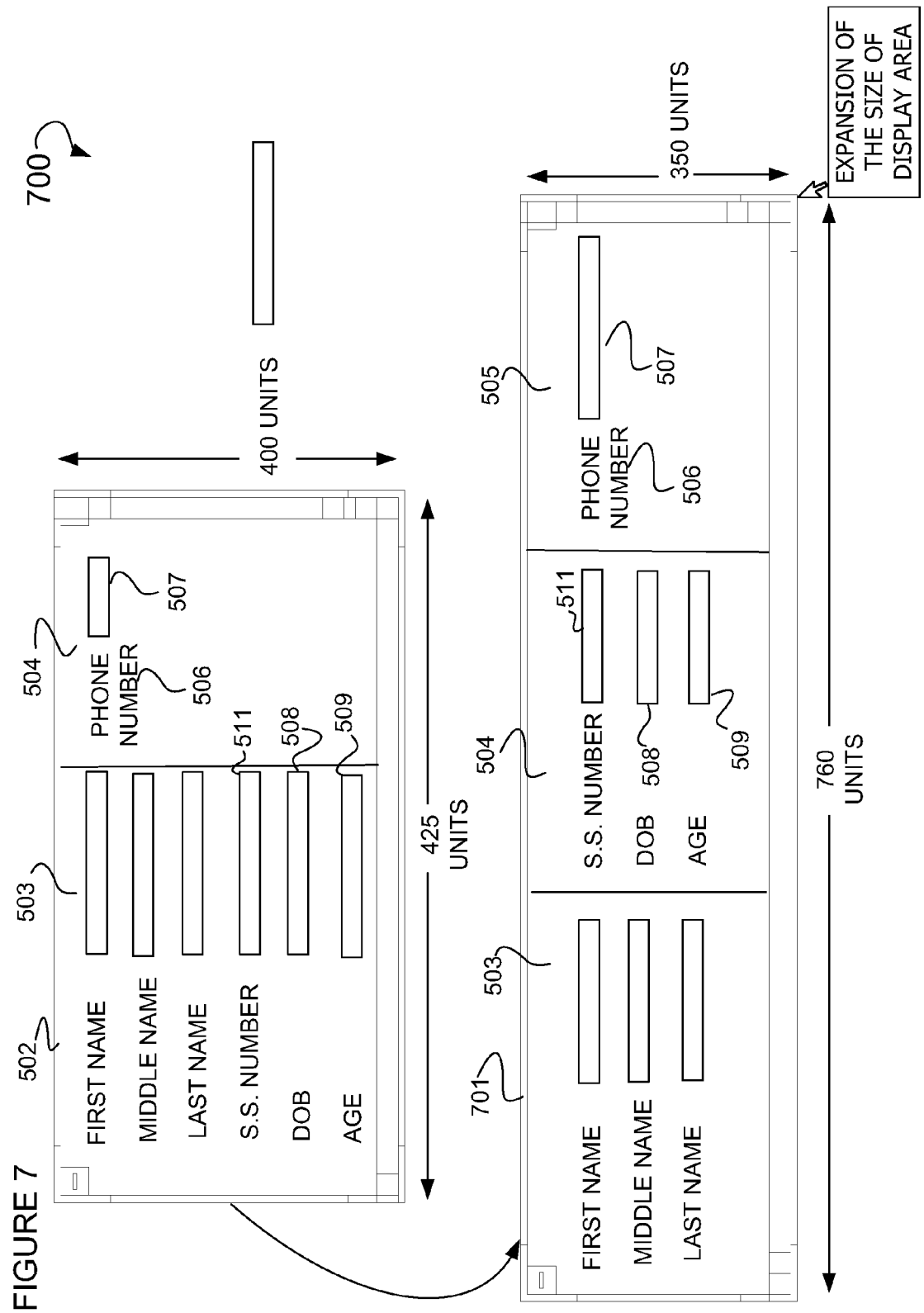
FIG. 7 is an interface sequence diagram illustrating a method used to expand a display area such that UI elements may be repositioned within new available space created by the expansion of the display area, according to an example embodiment.

FIG. 7 is an interface sequence diagram illustrating an example method 700 used to expand a display area such that UI elements may be repositioned within new space created by the expansion of the display area. Illustrated is a display area 502 containing a layout element 503 and layout element 504 in the form of columns. In certain instances, this display area 502 may be expanded as reflected in display area 701. Where this expansion occurs, a repositioning of UI elements may occur. Here, for example, UI elements 508 and 509 and UI element 507 are repositioned such that the UI elements 508 and 509 become associated with the column 504, and the UI element 507 becomes associated with the newly created column 505.

Figure 8:
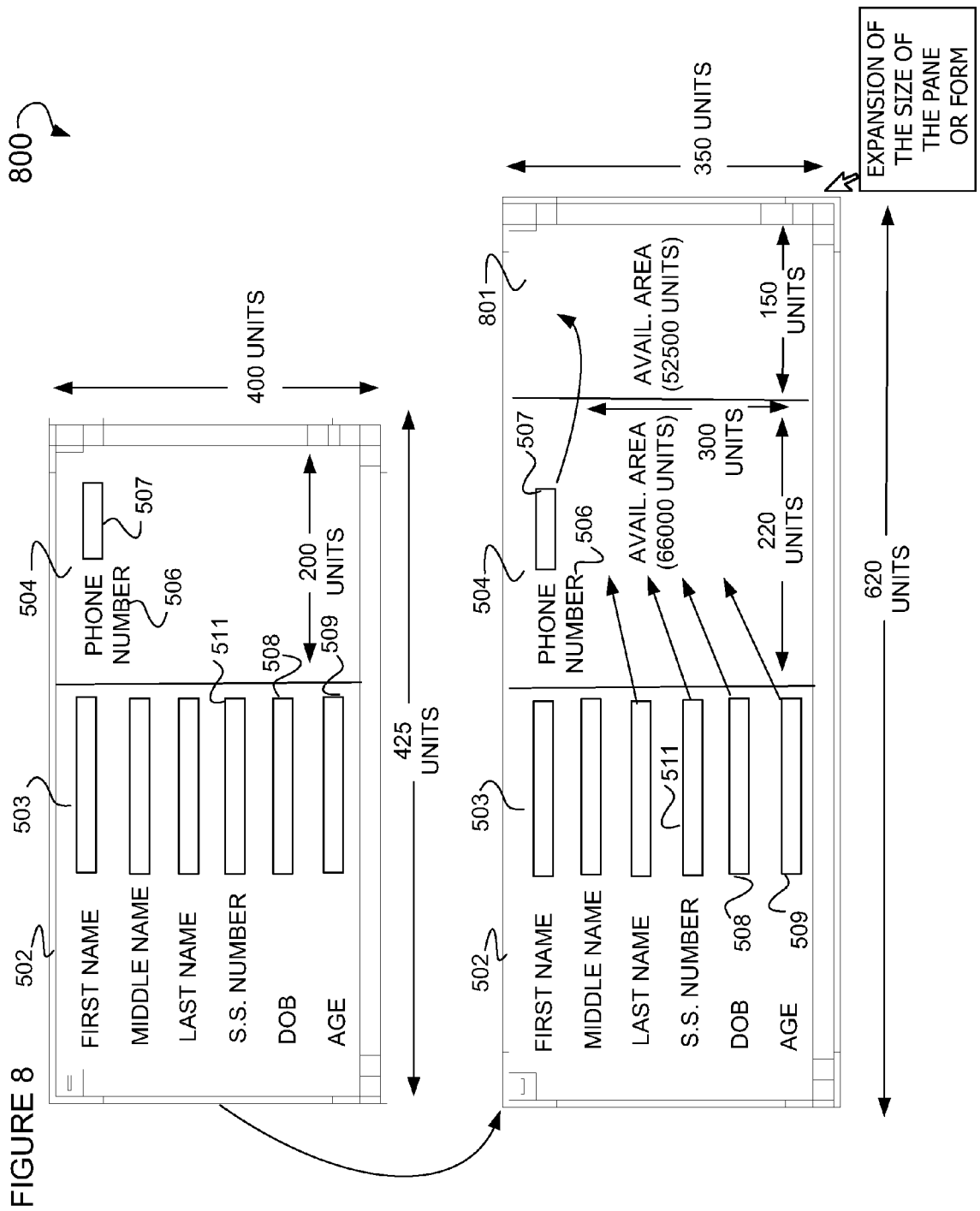
FIG. 8 is an interface sequence diagram of a method used to expand a display area and reposition the UI elements associated with various layout elements that make up this display area, according to an example embodiment.

FIG. 8 is a interface sequence diagram of an example method 800 used to expand a display area and reposition the UI elements associated with various layout elements that make up this display area. This repositioning may be based upon the relative percentage, and/or WYSIWYG approach. Illustrated is a display area 502 that has been expanded to create a new area as reflected in layout element 801 a column. Once expanded, the various UI elements previously associated with the layout elements used to make up display area 502 may be repositioned such that UI elements 508, 509, and 511 may be associated with column 504, a layout element. Similarly, UI element 507 may be repositioned to be associated with the layout element 801 This repositioning, in some cases, may be predicated upon the available space within each layout element such that this available space may be able to accommodate the UI element that is to be repositioned within this available space. The relative percentage value approach may be used in such cases. In cases where repositioning occurs, not only is the UI element (e.g., 508, 509, and 511) repositioned, but its accompanying label is also repositioned (e.g., "DOB", "AGE", and "S.S. NUMBER"), as this label may be considered to be a part of the UI element. In some cases, however, the label may not be considered as a part of the UI element, and may not be repositioned.

Figure 9:
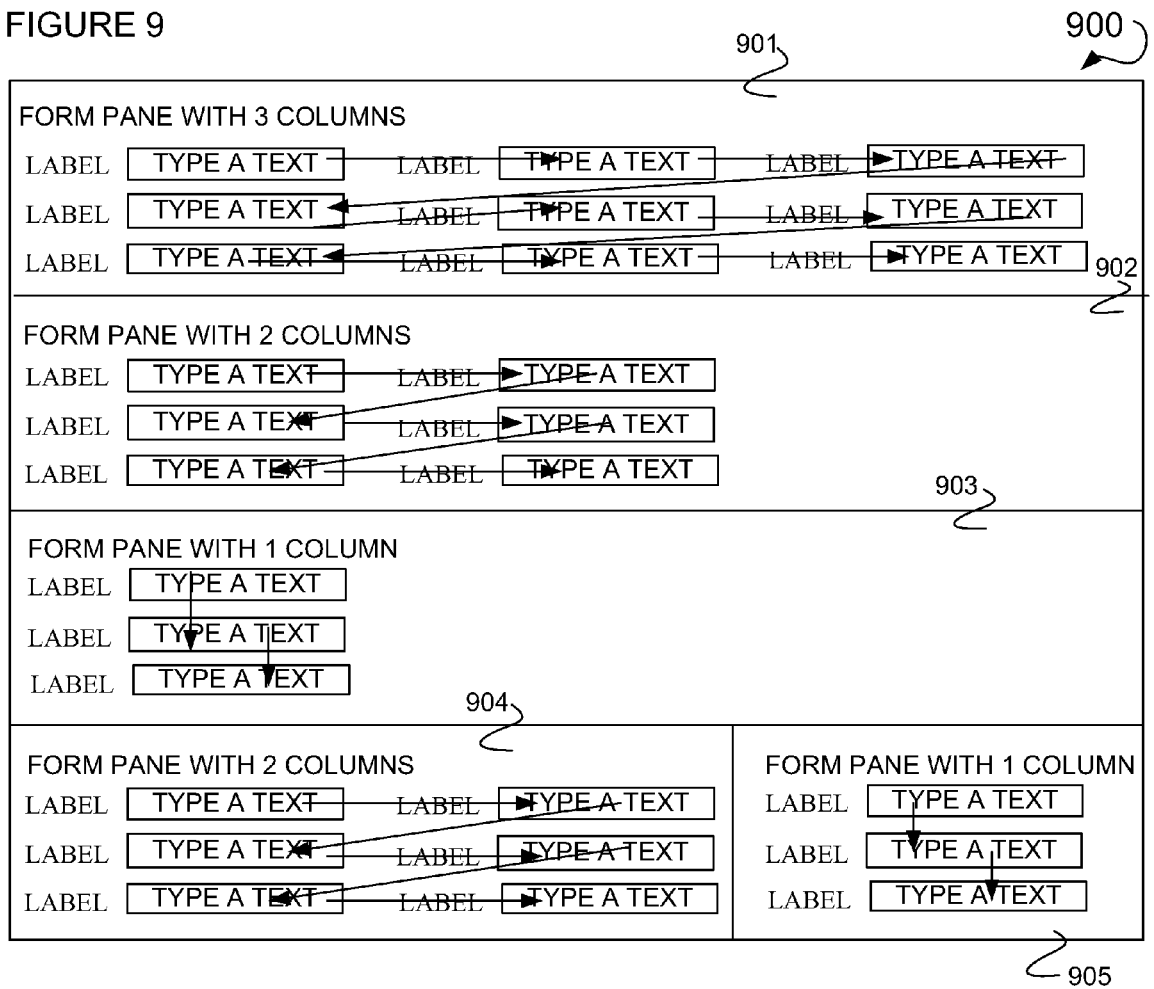
FIG. 9 is an interface sequence diagram of a display area containing a number of layout elements such as containers, and the traversal path for these layout elements, according to an example embodiment.

FIG. 9 is an interface sequence diagram of an example display area 900 containing a number of layout elements and the traversal path for these layout elements. Associated with each one of these layout elements, such as columns, are a number of UI elements in the form of, for example, textboxes with associated labels. These layout and associated UI elements may be repositioned using the method and system illustrated herein such the traversal path may be maintained despite the repositioning. Illustrated is a container 901 containing three columns and a plurality of textboxes. Various arrows are illustrated showing the traversal direction for each one of these textboxes such that, for example, where a user executes a tab command to traverse through these textboxes, the user will be able to traverse from a first textbox, to a second textbox, and to a third textbox located at the end of the third column. A subsequent tab command will allow the user to start again at the first column and traverse again through each one of the textboxes. Also illustrated is a container 902 with two columns that illustrate the traversal direction for each one of the textboxes associated with this container 902. Further illustrated are a container 903 and the associated traversal direction for each of the UI elements associated with it and a container 904 and 905, again, illustrating their traversal direction for each one of the UI elements associated with it. Some embodiments may include a command other than a tab command used to traverse through the text boxes.

Figure 10:
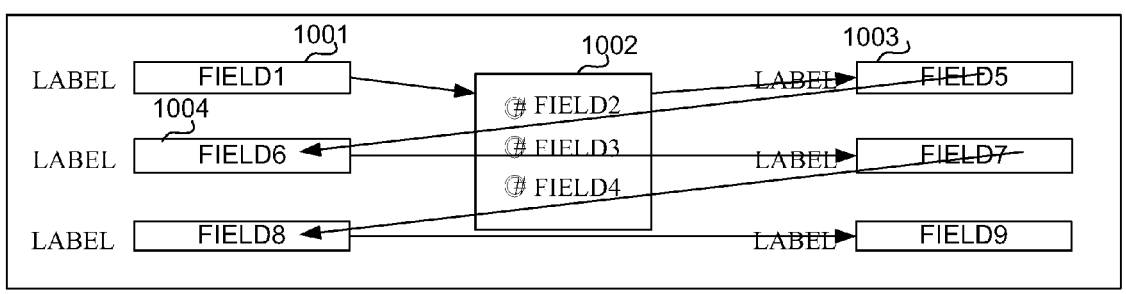
FIG. 10 is an interface sequence diagram of a display area, the various UI elements contained within this display area, and the traversal path for these UI elements, according to an example embodiment.

FIG. 10 is an interface sequence diagram of an example display area 1000, the various UI elements contained within this display area, and traversal path for these UI elements. These UI elements may be repositioned using the method and system illustrated herein such the traversal path may be maintained despite the repositioning. Illustrated, as examples, are a UI element 1001, a UI element 1002, and UI element 1003. In some cases, a user utilizing a tab function may traverse from the UI element 1001 to the UI element 1002. Next, a user may be able to traverse from the UI element 1002 to the UI element 1003 again using a tab function. Traversal may continue from the UI element 1003 to a UI element 1004 contained on a row or line below the row or line that the UI element 1001 resides on. As is illustrated, this traversal may continue indefinitely until one either traverses all of the UI elements appearing on the display area 1000, or until some other predetermined stop condition is met.

Example System and Logic

Figure 11:
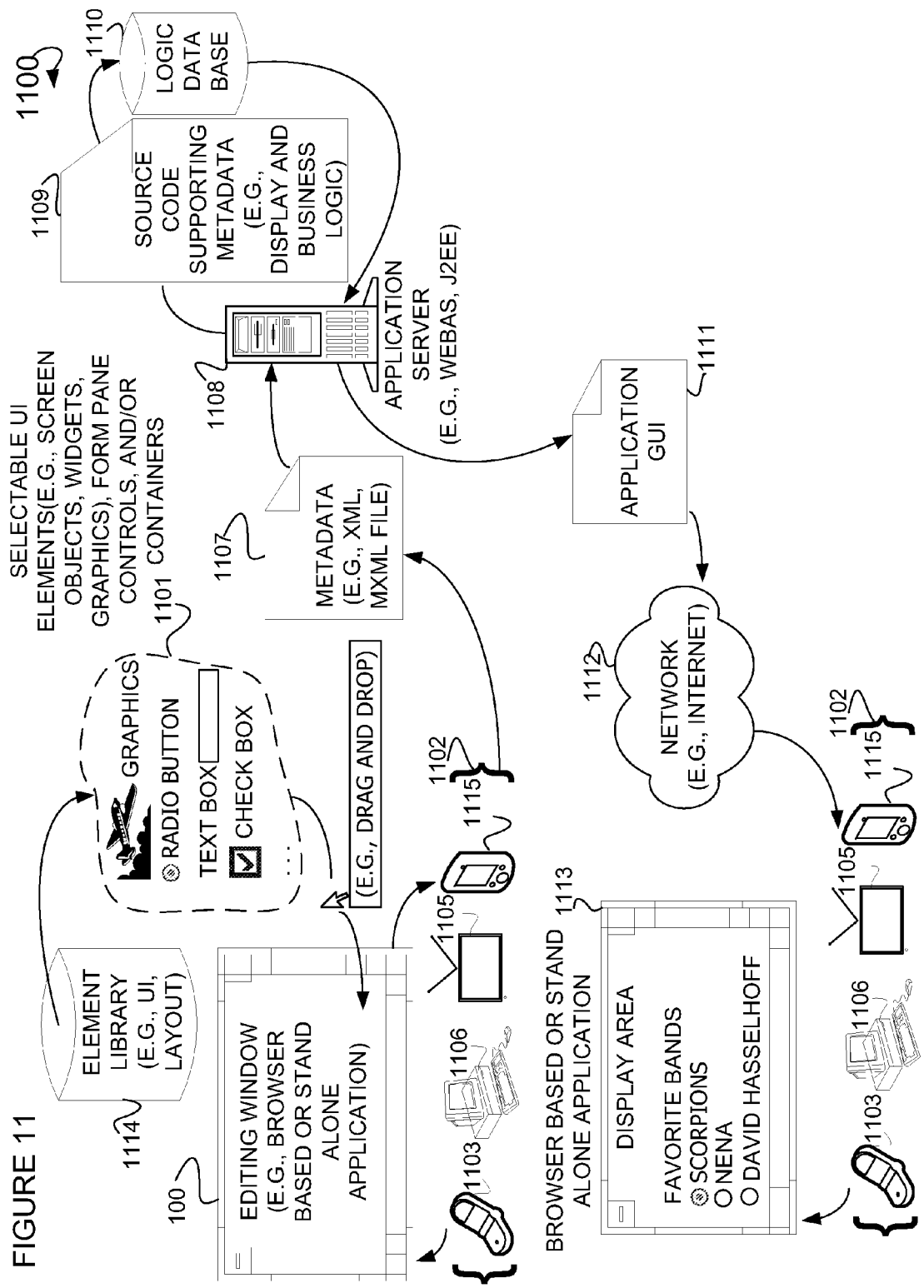
FIG. 11 is a system diagram illustrating the use of declarative programming principles in combination with certain pre-defined UI and layout elements, according to an example embodiment.

FIG. 11 is a system diagram of an example system 1100 illustrating the use of declarative programming principles in combination with certain predefined layout elements. Illustrated is a display area 100 in the form of an editing window. This editing window may be browser-based, or may be a stand-alone application that resides on any one of a number of devices 1102, including, for example, a cell phone 1103, a computer system 1106, a television 1105, and/or a Personal Digital Assistant (PDA) 1115. Using some type of input device, such as a mouse, a user may select certain UI elements. These UI elements may include various screen objects or widgets as are known in the art. Further, a user may select a collection of screen objects or widgets in the form of a form pane control. Collectively these individual UI elements or collection of UI elements are referenced herein as selectable UI elements 1101. These various selectable UI elements 1101 may be contained in, for example, an element library 1114 that is accessible by any one of the devices 1102. Once a user selects one or more UI elements, and associates it with one of the previously referenced layout elements, metadata is generated in the form of, for example, an Extensible Markup Language (XML) file, a Multimedia eXtensible Markup Language (MXML) file, or even an Electronic Business eXtensible Markup Language (EBXML) file. Once this metadata is generated, it is provided to an application server 1108. In some embodiments, more than one application server may be used. Application server 1108 may be, for example, a WEBAS™ application server, J2EE™ application server, or some other suitable application server. Once this metadata is provided to the application server 1108, source code 1109 is generated that contains source code generated based upon the metadata 1107. This source code may exist as a file, or as a data stream. This source code may also be, for example, source code relating to the display logic and business logic needed to use the data contained in the metadata. This source code 1109 is then, in some cases, stored into a logic database 1110.

Some embodiments may include the generation of the metadata 1107 by a user utilizing an editing window 100, while in other embodiments this metadata may be generated by another and stored as a sort of template. For example, such a template may be stored as an XML schema (e.g., a Document Type Definition (DTD), and/or XML Schema Definition (XSD)) into a table residing on a database (e.g., 1110 or 1114). In some embodiments, this template may be stored locally (e.g., residing on one of the devices 1102), or may be stored remotely and accessed remotely across a network (e.g., network 1112).

In certain cases, a user may choose to execute an application that utilizes the metadata 1107. This application may be in the form of, for example, an application GUI 1111. This application GUI 1111 may be accessed via a browser based application, or as a stand-alone application 1113. This browser based or stand-alone application 1113 may reside on one or more of the devices 1102, and may be accessed across a network 1112, such as the Internet. Once accessed, this application GUI 1111 may reside on a display area that will, in many cases, reflect the display area 100 and the various UI elements or layout elements associated with this display area. Here, for example, various UI elements or form pane controls are illustrated, wherein various radio buttons are provided that a user may select.

In some embodiments, a declarative programming regime is implemented in the example system 1100, whereby a user may design a software interface by merely selecting various UI elements. The functionality associated with each of these UI elements may, in some cases, be supplied automatically or nearly automatically via an application server such as the application server 1108. This application server 1108 may automatically generate, as previously illustrated, the various display and business logic source code such that, for example, rather than the user having to generate source code facilitating database access or code facilitating certain types of business logic methods, this code will be automatically generated by the application server 1108. One result of using this declarative programming regime is that rather than a user having to write or implement a software application from scratch and having to write or implement the functionality associated software application, a user may merely use their visual abilities to generate a GUI that will be fully supported on the backend by the requisite display and business logic. Various types of declarative programming regimes include, for example, WEBDYNAPRO™ and other suitable declarative programming regimes as are known in the art.

Figure 12:
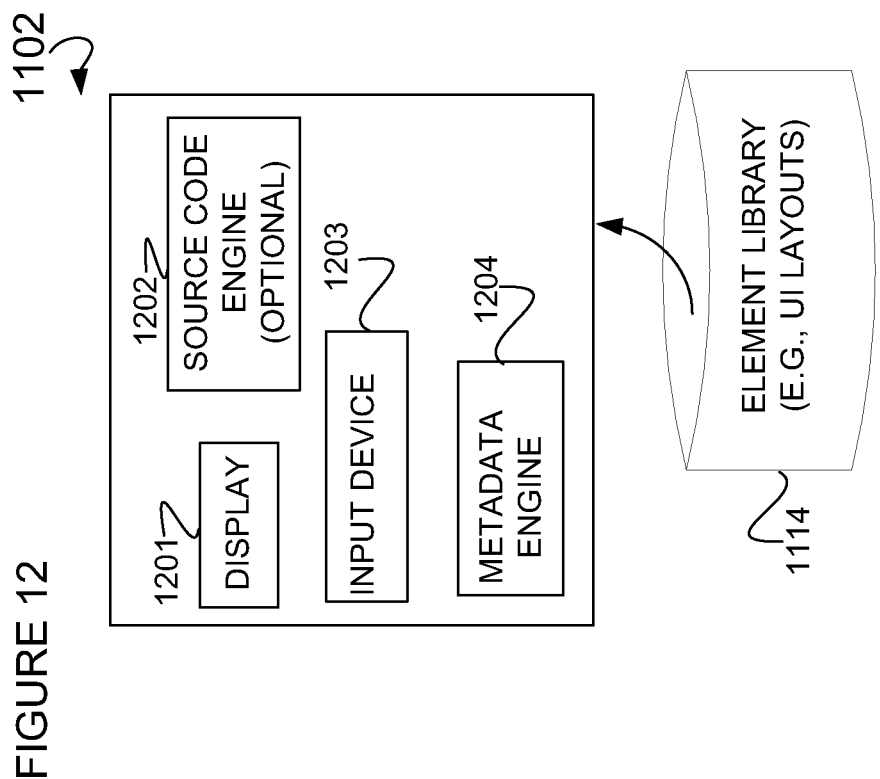
FIG. 12 is a block diagram of one of the devices used to create a column layout, according to an example embodiment.

FIG. 12 is a block diagram of one of the example devices 1102. Illustrated is a display 1201 being of some type of color, monochromatic, or other type of display used to display data in a visual manner. This display 1201, in some embodiments, may be operatively coupled to the device 1102. Additionally illustrated is an input device 1203 that also is operatively coupled to the device 1102. This input device 1203 may be, for example, a mouse, light pen, track ball, or other suitable input device. Further, a metadata engine 1204 is illustrated as being operatively coupled to the device 1102. The metadata engine 1204 may be used to take user input generated using the input device 1203 and convert the user input into some type of metadata format such as, for example, an XML, MXML, or EBXML file. This user input may be, for example, the selection of UI elements and the association of these UI elements with layout elements. Certain standards may be observed in generating the metadata including the United Nations-Core Components Technical Specification Standards (CCTS) model. Further, illustrated is a source code engine 1202, which in this case is optional. This source code engine 1202 may be used to generate source code in the form of JAVA™ source code, Advanced Business Application Programming (ABAP™) source code, or may be used to generate a binary file such as an SWF file, or some other suitable source code. Operatively coupled to this device 1102 is an element library 1114 that contains, for example, UI elements, or, for example, layout elements. This element library 1114 may be a database, in some cases in the form of an Online Analytic Processing (OLAP) database, a Relational Database (RDB), or some other suitable type of database. In some cases, this element library 1114 may reside on the device 1102 or may be operatively coupled to the device 1102, but managed by a separate database application. In some cases, this element library 1114 may reside on a device with persistent or non-persistent storage facilities.

Figure 13:
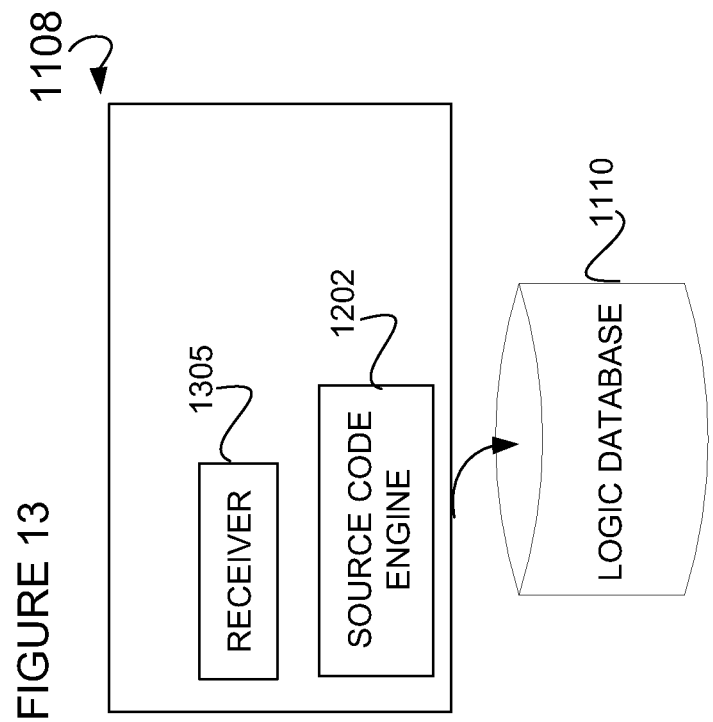
FIG. 13 is a block diagram of an application server used to create a column layout, according to an example embodiment.

FIG. 13 is a block diagram of an example application server 1108. Residing as apart of the application server 1108 is a receiver 1305. In some cases the receiver 1305 may, for example, be an adapter card that provides an interface between the application server 1108 and some other type of device such as, for example, a web server or other suitable device via a network connection, such as an Internet connection. Also illustrated is a source code engine 1202 that has functionality, as was previously illustrated, to provide for the conversion of metadata to some type of source code format to support the metadata and data defined therein. Further, operatively coupled to the application server 1108 is a logic database 1110, which provides for some type of persistent or non-persistent storage medium wherein business and display logic generated from the metadata by the source code engine 1202 is stored into this logic database 1110. In some embodiments, this logic database 1110 may be an OLAP database, RDB, or some other suitable database. In some cases, this logic database 1110 may reside on the application server 1108, or may be operatively coupled to the application server 1108 but yet managed by a separate database application.

Some embodiments may include a device such as a computer system (e.g., a server, client, or stand-alone machine) including a display 1201 to display an editing window, the editing window being a GUI used to design an application GUI, an input device 1203 to associate a UI element with a layout element, and a metadata engine 1204 to generate metadata, the metadata containing data illustrating the association between the UI element and the layout element. Additionally, this computer system may include a receiver 1305 to receive the metadata and a source code engine 1202 to generate source code from the metadata, the source code illustrating a display logic and business logic associated with the data in the metadata. In certain cases, the layout element is selected from the group consisting of columns and grids. Further, in certain cases, the UI element is selected from the group consisting of containers, tables, graphics, item list box, explanatory text, textboxes button groups, radio button groups, form pane headers, labels, fields, buttons, text views, melting groups, checkboxes, and drop down list boxes.

FIG. 14 is a dual stream flowchart illustrating an example method 1400 used to generate a display area, and associated UI elements and layout elements. Illustrated is a first stream entitled "Developer Side," containing various modules 1401 through 1406. Also illustrated is a second stream entitled "Application Server Side," containing modules 1407 through 1409. Starting with the developer side of the dual stream flowchart, an operation 1401 is illustrated that executes a design application. This design application may be, for example, VISUAL COMPOSER™, or some other NETWEAVER™-based application window. Other design applications may include .NET™, or some other suitable design application. Next, an operation 1402 is executed that displays an actual editing window. This editing window, in some cases, may illustrate a display area and various UI elements and layout elements represented as various selectable icons. These UI elements, and/or layout elements may be selected by, in some cases, using an input device such as a mouse to click on and then drag and drop the UI element or layout element into the display area. Further, an operation 1403 is shown wherein the selecting of the layout occurs, wherein certain types of UI elements and layout elements are selected as previously illustrated. Additionally an operation 1404 is shown wherein certain types of UI elements are selected as previously illustrated. Once the layout elements and UI elements are selected, an operation 1405 is executed, wherein these UI elements and layout elements are associated together. In some cases, this association occurs automatically through the previously illustrated drag-and-drop method. Further, in some cases, various predefined default layout elements are used such that only UI elements need be selected.

In cases where a UI element is associated with a layout element, various types of association data is generated as a UI data set, wherein the UI element uses a certain amount of unit area within the layout element. This unit area is in effect reserved for use by the particular UI element. An area not used by a UI element may be deemed to be available space for utilization by additional UI elements. Once the operation 1405 is executed, operation 1406 is executed that generates metadata illustrating, amongst other things, the association data contained in the UI data set. This metadata is then provided to, for example, an application server 1108 as an XML, MXML, and/or EBXML formatted data. In some cases, an operation 1407 is performed at the application server side that receives metadata. Once received, the operation 1408 is executed that generates supporting source code for this metadata. This source code may be, for example, ABAP™, JAVA™, and/or an SWF file. Once this source code is generated, it is then stored into a database 1110 by an operation 1409. In some cases, the operation 1408 will generate both the display logic and accompanying business logic used to facilitate the implementation of a UI element and associated layout element.

Figure 15:
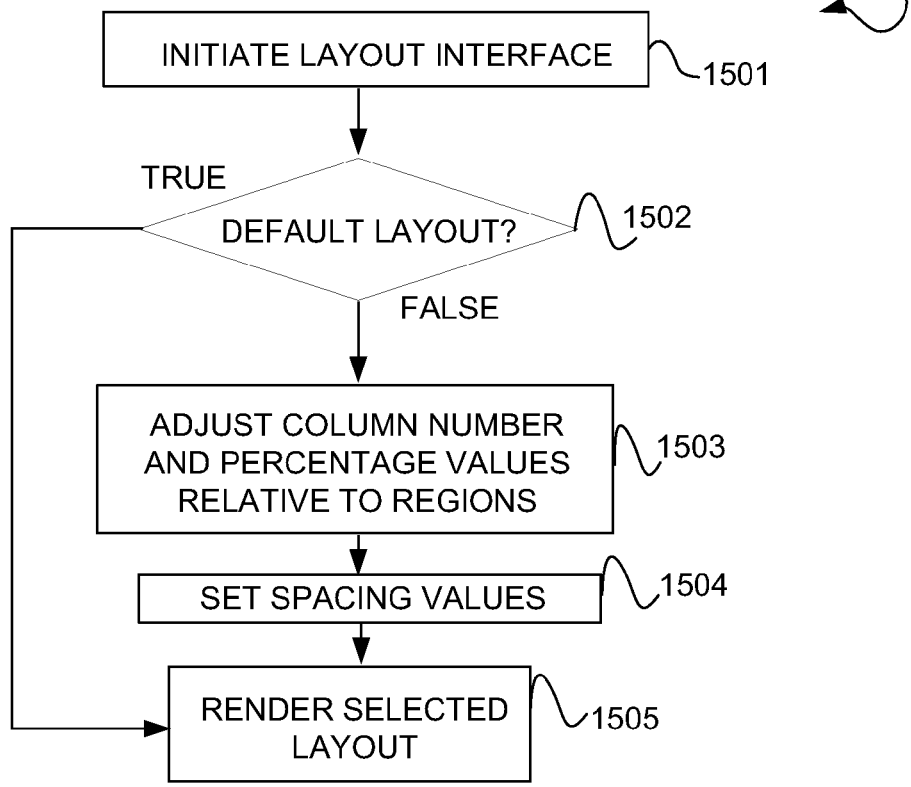
FIG. 15 is a flowchart illustrating a method to select a layout and associated layout elements, according to an example embodiment.

FIG. 15 is a flowchart illustrating an example method used to execute operation 1403. Illustrated is an operation 1501 that initiates a layout interface. This initiation of a layout interface may be in the form of, for example, a display area 100 appearing within an editing window. Once operation 1501 is executed, a decisional operation 1502 is executed that determines whether a default layout has been requested by a user. In cases where decisional operation 1502 evaluates to "true," an operation 1505 is executed that renders the default, and/or selected layout. In cases where decisional operation 1502 evaluates to "false," an operation 1503 is executed that records the layout elements selected by a user in terms of the percentage of a display area that it takes up such that, for example, if a column takes up a quarter of a display area, its corresponding area in terms of units, may be used to identify the column. Once operation 1503 is executed, an operation 1504 is executed that sets certain spacing values. These spacing values may be certain types of buffer or padding areas that are inserted between certain types of layout elements such that, for example, a space value or a space may exist between two adjacent columns. Once the layout is selected, it may then be rendered by the previously illustrated operation 1505.

Figure 16:
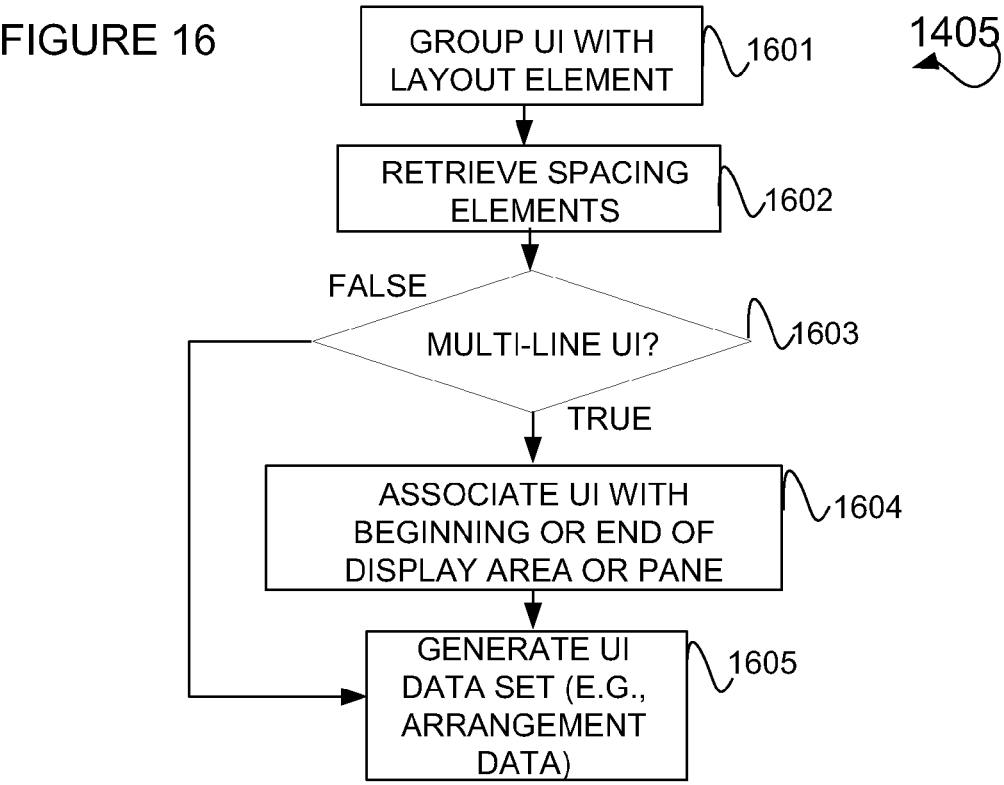
FIG. 16 is a flowchart illustrating a method used to associate a UI element with a layout element, according to an example embodiment.

FIG. 16 is a flowchart illustrating an example method used in operation 1405. Illustrated is an operation 1601 that groups UI and layout elements together. As previously illustrated, in cases where this grouping occurs, the UI element may be deemed oriented to, or grouped with certain aspects of an individual layout element such that the UI element takes up a certain area (e.g., a percentage area) within the layout element. When this percentage value is either exceeded or reduced, then a repositioning of the UI element by associating it with another layout element may be required. Alternatively, where certain static values are violated, repositioning may be required (e.g., the WYSIWYG approach outlined above). Once the operation 1601 is executed, an operation 1602 is executed that retrieves certain spacing elements so as to space the UI elements. Next, decisional operation 1603 is executed that determines whether or not a multi-line UI has been utilized. In cases where decisional operation 1603 evaluates to "false," an operation 1605 is executed that generates a UI dataset that contains, for example, arrangement data. In cases where decisional operation 1603 evaluates to "true," an operation 1604 is executed that associates a UI element with a beginning or end of a display area or, for example, a container. Next, the operation 1605 is executed that generates the UI dataset.

Figure 17:
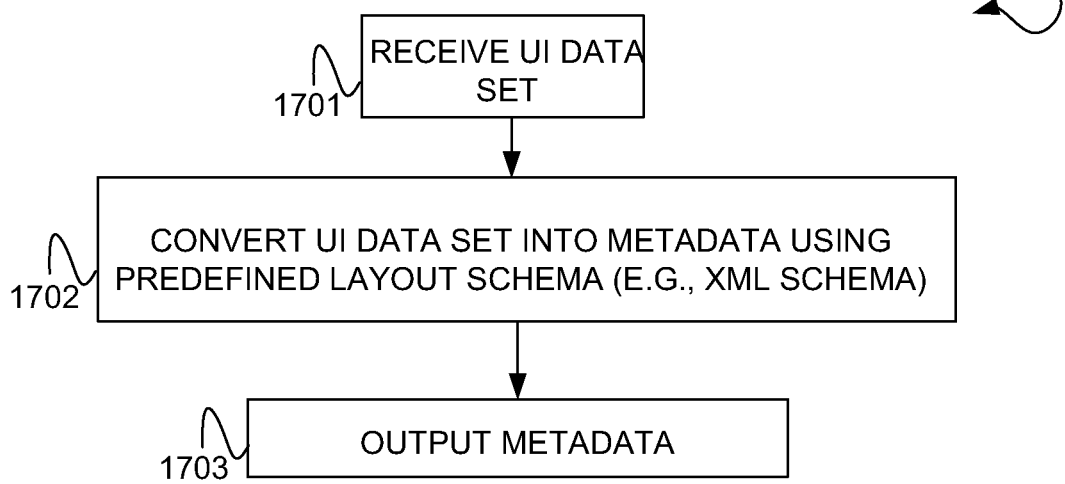
FIG. 17 is a flowchart illustrating a method used to generate metadata reflecting, among other things, the association of the UI element and layout element, according to an example embodiment.

FIG. 17 is a flowchart illustrating an example method used to execute operation 1406. Illustrated is an operation 1701 that receives a UI dataset. Once received, an operation 1702 is executed and it converts the UI dataset into some type of metadata using a predefined schema. In some cases this predefined schema may be, for example, a DTD or XSD. Once this UI data is converted into metadata, an operation 1703 is executed that outputs this metadata as, for example, an XML, MXML, and/or an EBXML file.

Figure 18:
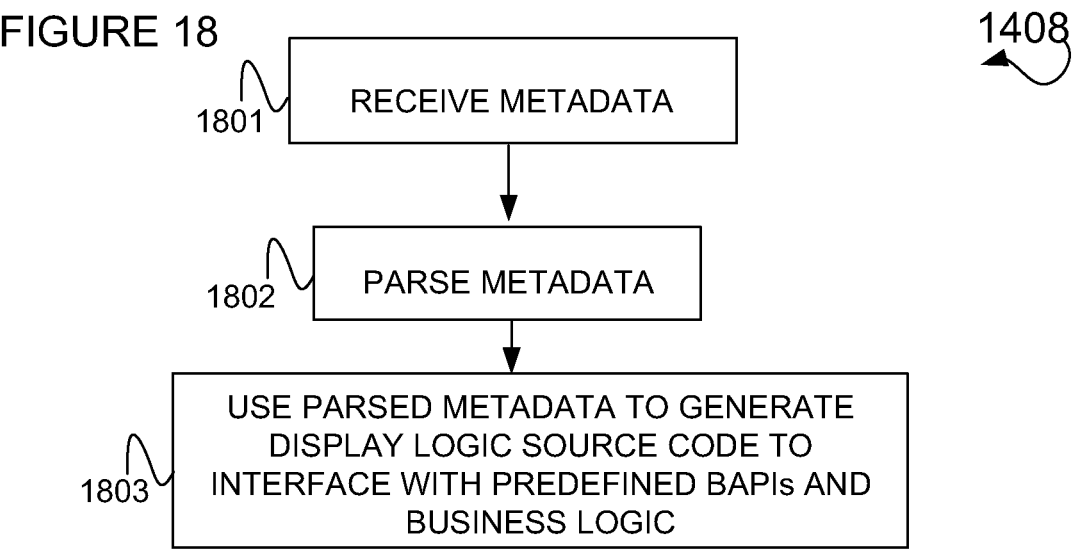
FIG. 18 is a flowchart illustrating a method used to generate the source code supporting the UI element and layout element, according to an example embodiment.

FIG. 18 is a flowchart illustrating an example method used to execute operation 1408. Illustrated is an operation 1801 that, when executed, facilitates the reception of metadata in the form of, for example, an XML, MXML, and/or EBXML file. Next, an operation 1802 is executed that parses this metadata using some type of predefined grammar into its constituent parts. Further, the operation 1803 is executed that uses this parsed metadata to generate source code in the form of display logic and, in some cases, business logic. In some instances, this display logic will interact with various Business Application Programming Interfaces (BAPI). This operation for generation of display logic and business logic may be facilitated, in some cases, automatically as a part of a declarative programming based application. In certain instances after the UI elements and layout elements are associated together and a metadata generated, this metadata may be turned into source code. This method of turning metadata into source code may be automated or semi automated such that, for example, various Structured Query Language (SQL) queries may be generated and a user (e.g., a software developer) need only fine-tune or otherwise specify the specific data that is being requested via, for example, the SQL query.

Figure 19:
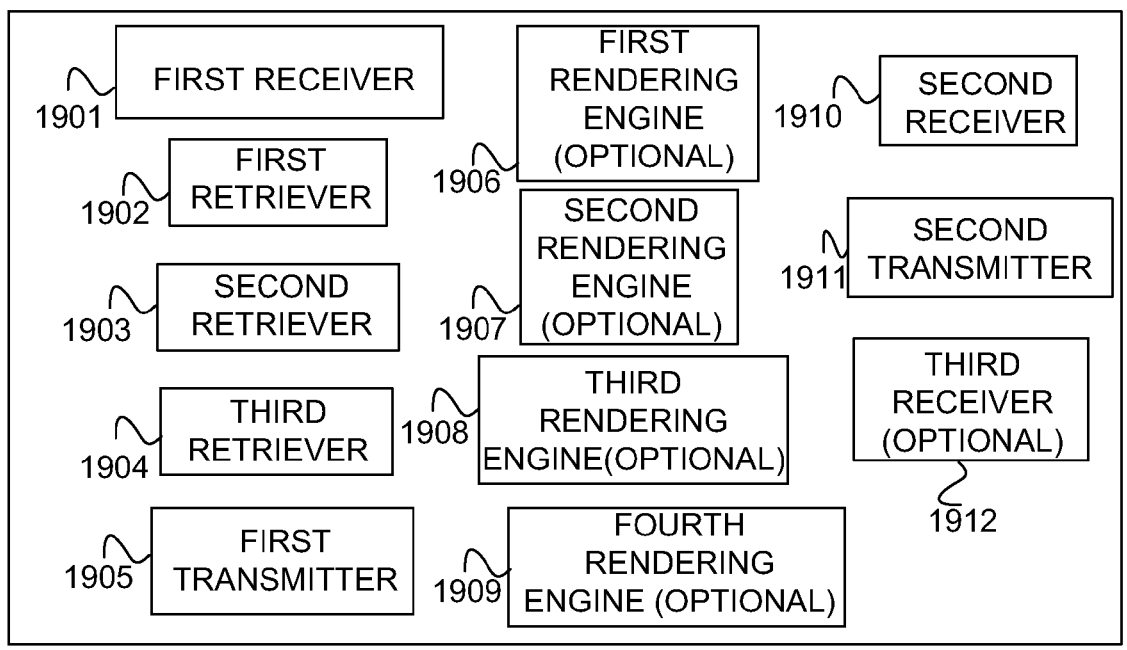
FIG. 19 is a block diagram illustrating an application server used to generate an application GUI, according to an example embodiment.

FIG. 19 is a block diagram illustrating an example application server 1108. A first receiver 1901 may be, for example, a network adaptor card or other type of interface facilitating the exchange of data between the application server 1108 and some other device such as, for example, one or more of the devices 1102. The first receiver 1901 is, in many cases, operably coupled to the application server 1108. A first retriever 1902 retrieves metadata illustrating, for example, layout elements and associated user interface elements relating to an application GUI 1111. Further a second retriever 1903 may retrieve display logic associated with the metadata relating to the application GUI 1111. Moreover, in some cases, a third retriever 1904 retrieves business logic associated with metadata and relating to the application GUI 1111. In addition to the various blocks 1901 through 1904, which are operably coupled to the application server 1108, a block 1905 represents a first transmitter. The transmitter 1905 may transmit, for example, an application GUI 1111 generated using the metadata display logic and business logic. In some cases this first transmitter 1905 may also be, for example, some type of network adaptor card.

Some embodiments may include various rendering engines (e.g., 1906-1909) coupled to the application server 1108. These rendering engines, in some cases, may or may not reside as a part of the application server 1108. In some cases a first rendering engine 1906 may be used to shrink horizontally an input UI to a minimum threshold value, wherein this rendering engine only shrinks this input UI until this minimum threshold value is reached. Further, in some cases, a second rendering engine 1907 is executed that allows the field of a UI element to wrap until some minimum threshold value is reached. Moreover, in some cases, a third rendering engine 1908 is executed that allows for the reduction of a form pane header until some minimum threshold value is reached. Additionally, a fourth rendering engine 1909 may be executed that allows for a horizontal scroll to continue until some threshold value is reached. Put another way, using the fourth rendering engine 1909, one may be able to scroll some distance that is predefined using some input device. These various rendering engines (e.g., 1906-1909) may be separate and distinct, or in some cases may be combined to form one rendering engine.

In addition to the previously illustrated modules (e.g., 1901-1909), additional modules may also exist, such as for example, a second receiver 1910, a second transmitter 1911, and a third optional receiver 1912. With regard to the second receiver 1910, this receiver may be implemented to receive a second set of rendering data wherein this rendering data is used to resize a display area within which, for example, a GUI may be displayed. The second transmitter may be used, for example, to transmit a second GUI or an additional GUI that is generated based upon the second dataset received using the second receiver. Further, the third receiver 1912 may be used to render or otherwise resize a display area within which a GUI is displayed to be larger or even in some cases smaller than some previously displayed display area. Further, this device may include an optimizer (not pictured), which may, in some cases, optimize a GUI by eliminating an empty column, the empty column being empty as a result of a display area size.

Figure 20:
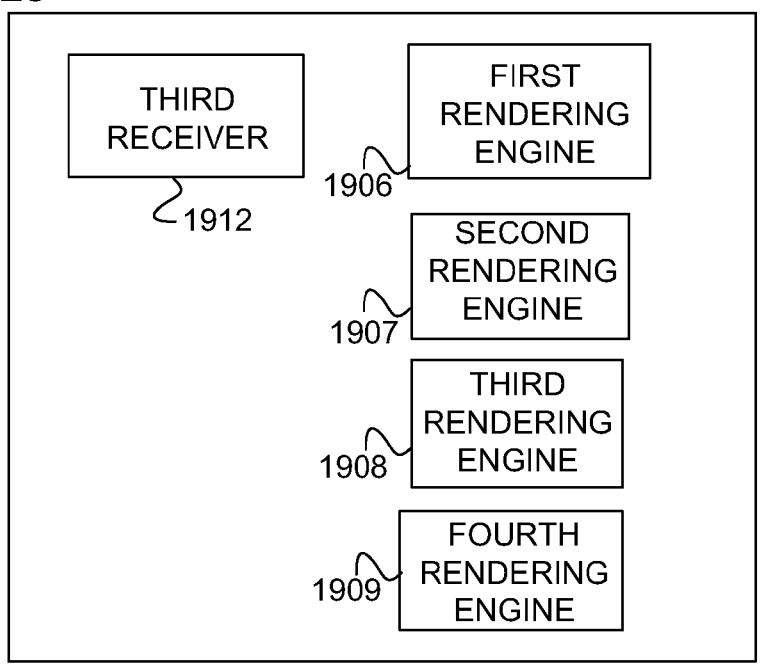
FIG. 20 is a block diagram of an example device used in the rendering of the display area for the application GUI, according to an example embodiment.

FIG. 20 is a block diagram of an example device 1102 containing various blocks used in the rendering of the area. Illustrated is one or more of the previously illustrated rendering engines (e.g., 1906-1909). In addition to these various rendering engines, a third receiver 1912 is illustrated. In some cases these rendering engines may be thought of collectively as a single rendering engine manifesting the various functionalities illustrated for each of the rendering engines. Further, this device may include an optimizer (not pictured), which may, in some cases, optimize a GUI by eliminating an empty column, the empty column being empty as a result of a display area size.

Example embodiments may include a device such as a computer system (e.g., a server, client, or stand-alone machine) that includes a first receiver 1901 to receive a service request relating to an application, the service request including a first set of rendering data illustrating a display area within which a first GUI relating to the application will be displayed; a first rendering engine 1906 to retrieve metadata, the metadata illustrating layout elements and associated UI elements relating to the first GUI; a second rendering engine 1907 to retrieve display logic associated with the metadata; a third rendering engine 1908 to retrieve business logic associated with the metadata; and a first transmitter 1905 to transmit the first GUI, wherein the first GUI is generated using the metadata, display logic and business logic. Further, this computer system may include an optimizer, which may, in some cases, optimize a GUI by eliminating an empty column, the empty column being empty as a result of a display area size. Additionally, this computer system may include a second receiver 1910 to receive a second set of rendering data, the second set of rendering data to resize the display area within which the first GUI is displayed, and a second transmitter 1911 to transmit a second GUI relating to the application, the second GUI being generated using data including the second set of rendering data. Moreover, this computer system (e.g., a server or client machine) may include the third receiver 1912 to receive a second set of rendering data that resizes the display area of the first GUI to be smaller than as previously rendered, the first rendering engine 1906 to shrink horizontally an input UI to a minimum threshold value relating to the input UI is reached, a second rendering engine 1907 to wrap a UI field until a minimum threshold value relating to a UI field is reached, a third rendering engine 1908 to reduce a form pane header until a minimum threshold value relating to a form pane header is reached, and a fourth rendering engine 1909 to force a horizontal scroll until a minimum threshold value relating to a field length is reached. Additionally, this computer system may include the third receiver 1912 to receive a second set of rendering data to resize the display area of the first GUI to be larger than as previously rendered, a first rendering engine 1906 expanding an input box field until a maximum threshold value relating to the input box field is reached, and the second rendering engine 1907 to unwrap a UI label where it is able to render on one line.

Figure 21:
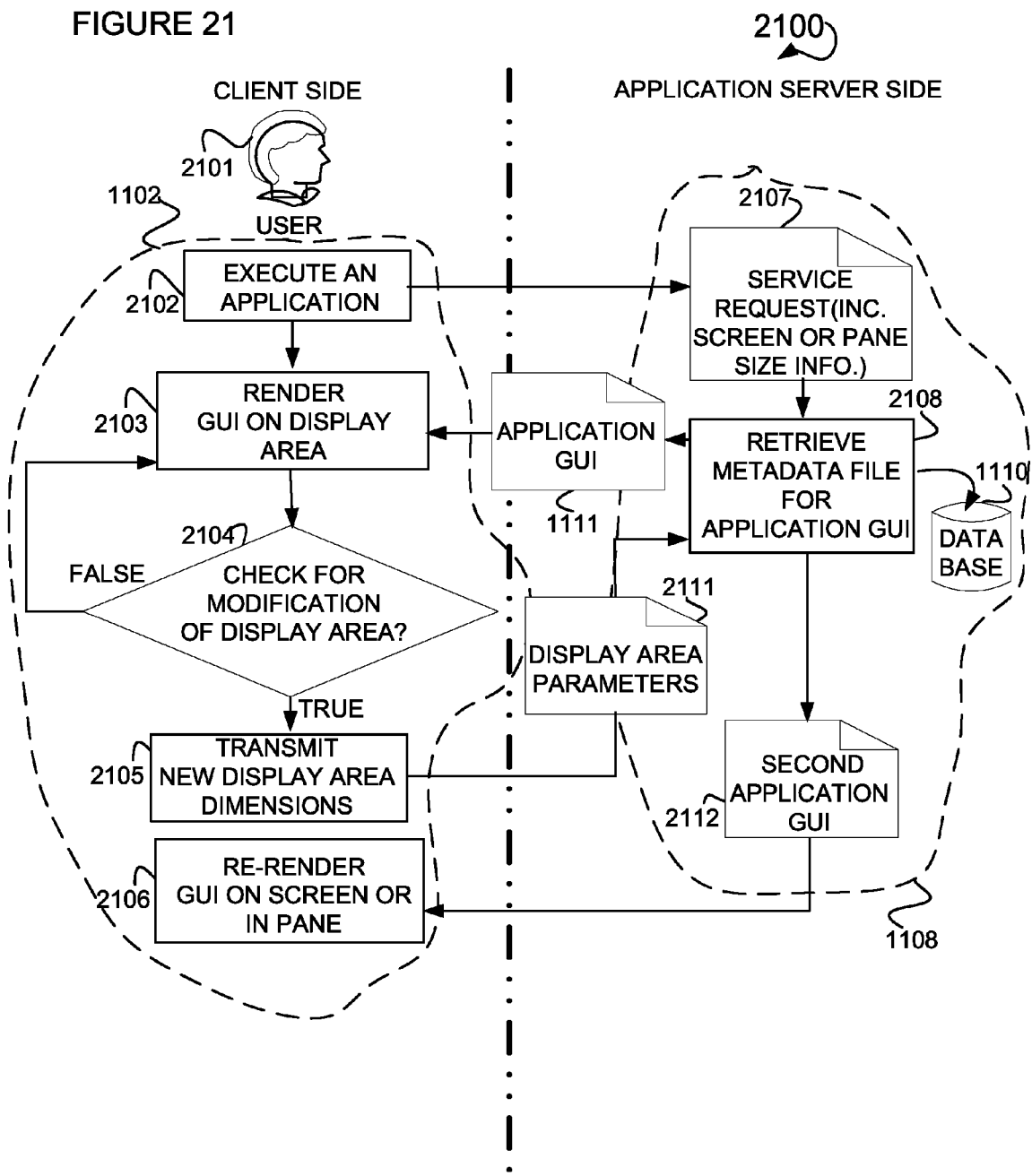
FIG. 21 is a dual stream flowchart illustrating a method used to resize a display area, according to an example embodiment.

FIG. 21 is a dual stream flowchart illustrating an example method 2100 used to resize a display area. Illustrated is a first stream entitled "Client Side" containing modules 2102 through 2106. Also illustrated is a second stream entitled "Application Server Side" containing various modules 1108 operatively coupled to a database 1110. With regard to the first stream of the dual stream flowchart, a user 2101 executes, for example, a web application in the form of an operation 2102. In certain cases, in lieu of executing a web application, the user 2101 may execute a stand-alone application that resides on, for example, one or more of the devices 1102. Once the operation 2102 is executed, in some cases, a session is initiated between one or more of the devices 1102 and, for example, an application server 1108. Once this session is initiated, an operation 2103 is executed that renders a GUI on a display area. This GUI may be rendered as the result of sending a service request 2107 using the operation 2102 during the course of an initiation of a session between one or more of the devices 1102 and the application server 1108. The service request 2107 is received by the application server 1108 and executed as an operation 2108 that resides on the application server 1108. Next, this operation 2108 retrieves a metadata from, for example, a database 1110 and after retrieving this metadata retrieves the display logic and business logic associated with this metadata as stored on the database 1110. Once retrieved, an application GUI 1111 is sent from the application server 1108 to one or more of the devices 1102 where it is received through the execution of an operation 2103.

In some embodiments, once the application GUI 1111 is received, a decisional operation 2104 is executed that checks to determine whether or not a modification has been made to the display area (e.g., a display area 100). As previously illustrated, this modification may be made by, for example, a user 2101 using some type of input device such as a mouse to reshape (e.g., expand or reduce) the size of a display area. In cases where decisional operation 2104 evaluates to "false," then the operation 2103 continues to execute such that a GUI is rendered on a display area. In cases where decision operation 2104 evaluates to "true," an operation 2105 is executed that transmits the new display area dimensions to the applications server 1108 and specifically to the operation 2108 presiding on the application server 1108. These new display area dimensions are transmitted as display area parameters 2111. Moreover, these display area parameters may be transmitted as a part of, for example, a web session existing between one or more of the devices 1102 and the application server 1108, and may be transmitted using any one of a number of suitable protocols used on the Internet (e.g., the Transmission Control Protocol/Internet Protocol (TCP/IP), and/or the User Datagram Protocol/Internet Protocol (UDP/IP)). Once the operation 2108 receives the display area parameters transmitted by the operation 2105, a second application GUI 2112 is generated and sent by, or otherwise transmitted by, the application server 1108 to the one or more devices 1102 where it was received by operation 2106, wherein the operation 2106 re-renders the application GUI 2112 in a display area. As previously illustrated, in some cases, this rendering is performed via any one of a number of rendering engines. These rendering engines may reside on, for example, the application server 1108 or may reside on the one or more devices 1102.

Figure 22:
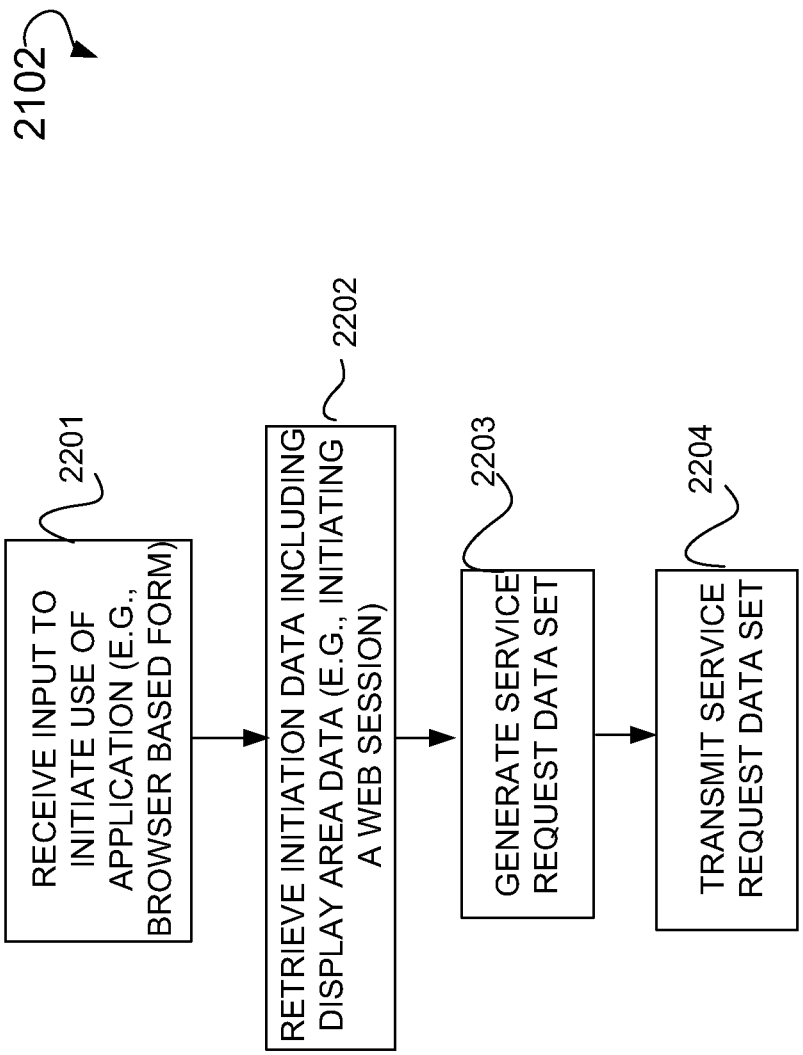
FIG. 22 is a flowchart illustrating a method used to execute an application that includes a GUI, according to an example embodiment.

FIG. 22 is a flowchart illustrating an example method used to execute operation 2102. Illustrated is an operation 2201 that receives input to initiate the use of an application. For example, in some cases operation 2201 receives an input from, for example, a mouse or other type of input device so as to initiate a browser-based, and/or stand-alone application. Once operation 2201 is executed, an operation 2202 is executed that retrieves initiation or initialization data including, for example, display area data. This data may be retrieved, for example, during the initiation of a web session and may be in the form of, for example, data relating to the particular display area size available to, for example, a user 2101, or may even in some cases be the physical screen size of a monitor operably coupled to the one or more devices 1102 the user 2101 may be using. Next, an operation 2203 is executed that generates service request dataset. The service request dataset, as previously illustrated, may in some cases contain display area data and other relevant data necessary for the application server 1108 to provide an application GUI (e.g., 1111) to the user 2101 utilizing the one or more devices 1102. Additionally an operation 2204 is executed that transmits the service request dataset to the application server 1108.

Figure 23:
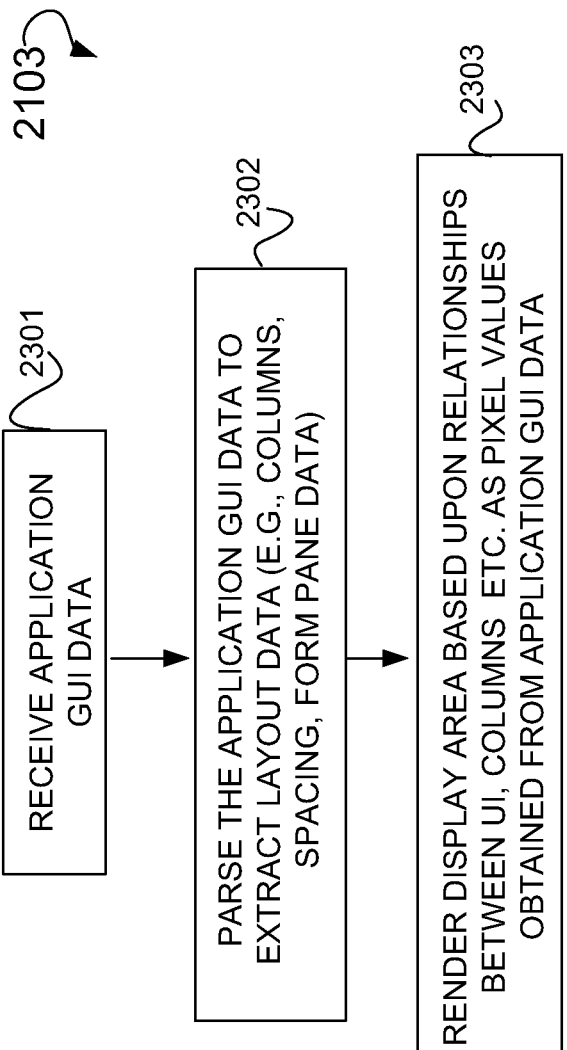
FIG. 23 is a flowchart illustrating a method used to render a GUI on a display area, according to an example embodiment.

FIG. 23 is a flowchart illustrating an example method used to execute operation 2103. Illustrated is an operation 2301 that receives application GUI data. Next, an operation 2302 is executed that parses the application GUI 1111 data to extract layout data. This data may include, for example, data relating to containers, nested columns and tab strips, tab strips, or other types of previously illustrated layout elements. Once parsed, operation 2303 is executed that renders a display area based upon the relationship between various UI elements and layout elements. This rendering is based upon the association of the UI elements to the layout elements, where an association may be defined as, for example, a relationship in terms of a percentage of a layout element occupied by a UI element.

Figure 24:
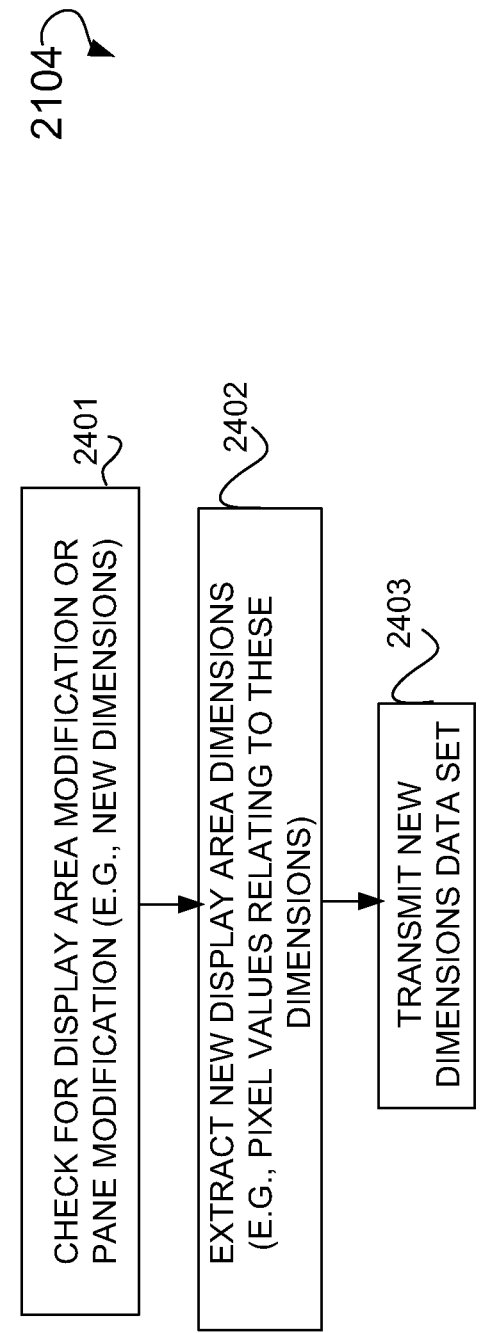
FIG. 24 is a flowchart illustrating a method used to check for the modification of a display area, according to an example embodiment.

FIG. 24 is a flowchart illustrating an example method used to execute an operation 2104. Illustrated is an operation 2401 that checks for display area modifications or even layout element modifications. For example, operation 2401 may check for the creation or the existence of new dimensions for a display area or layout element. Next, an operation 2402 is executed that extracts these new display area or layout element modifications in the form of certain unit values relating to these new dimensions. Put another way, in instances where, for example, a user 2101 modifies a display area (e.g., 100) using some type of input device such as a mouse, the resultant unit values relating to the area of the new display area or layout element are extracted and stored. These new unit values are stored as a new dimensions dataset. Once the new dimensions dataset is extracted, an operation 2403 is executed that transmits this new dimensions dataset to, for example, the application server 1108.

Figure 25:
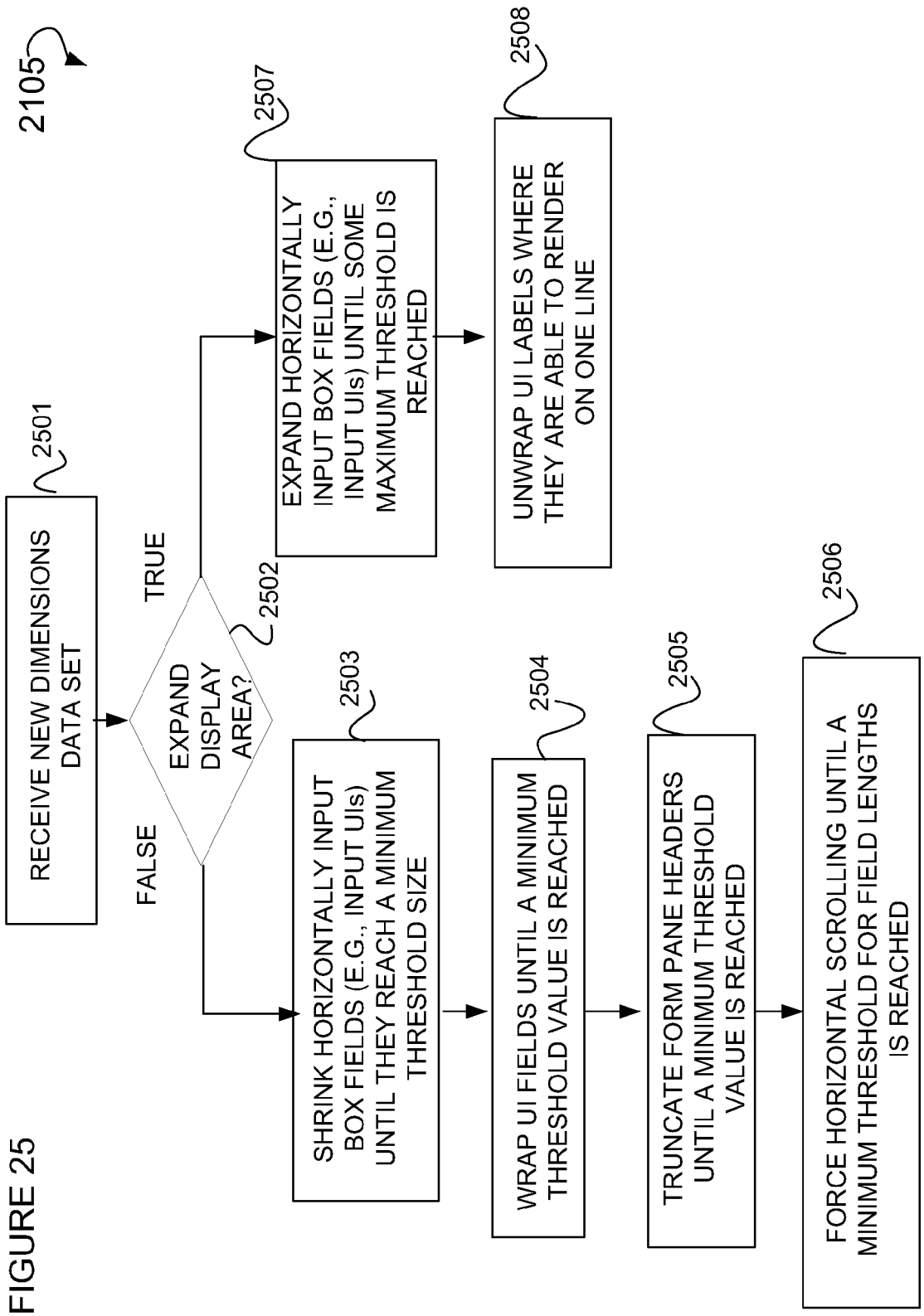
FIG. 25 is a flowchart illustrating a method used to transmit new display area dimensions, according to an example embodiment

FIG. 25 is a flowchart illustrating an example method used in an operation 2105. This operation 2105 may reside on one or more of the device 1102 or the application server 1108. Illustrated is an operation 2501 that receives a new dimensions dataset. Once received, a decisional operation 2502 is executed that determines whether or not the new dimensions dataset reflect a display area, and/or layout element that are being resized to be expanded or reduced in size. In cases where the decisional operation 2502 evaluates to "false," an operation 2503 is executed that shrinks horizontally certain input box fields until they reach a minimum threshold size. Next an operation 2504 is executed that wraps UI fields until some type of minimal threshold value is reached. Further an operation 2505 is executed that truncates, for example, form pane headers until some minimum threshold value is reached. Further, an operation 2506 executed forces horizontal scrolling until some minimum threshold value is reached for a particular field length. Collectively various modules (e.g., 2503-2506) facilitate the repositioning of various UI elements such that where available space exists within or associated with a particular layout element, the UI element may be repositioned to fill this space. This repositioning may be predicated upon one or more algorithms, wherein these one or more algorithms may analyze the available space and make a determination upon whether or not this available space is adequate to accommodate one or more UI elements. Absent repositioning, these UI elements may be truncated due to the reduction in size of the display area and available space in, for example, one or more of the layout elements.

In cases where decisional operation 2502 evaluates to "true," an operation 2507 is executed that may expand an input box field horizontally until some maximum threshold value is reached. Next, the operation 2508 is executed that may unwrap UI element labels where they are able to render on one line. Collectively these operations (e.g., 2507-2508) facilitate the repositioning of various UI elements where additional space exists during the expansion of the display area for a particular GUI. For example, in certain cases a display area may be expanded such that additional layout elements may exist within a display area (e.g., columns, pane forms, et cetera). Where such an expansion takes place, the UI elements may be repositioned to fill otherwise empty or otherwise available space created by the expansion. Once these operations (e.g., 2503-2506 or 2507-2508) are executed, new display area parameters 2111 are transmitted requesting a second application GUI 2112.

Figure 26:
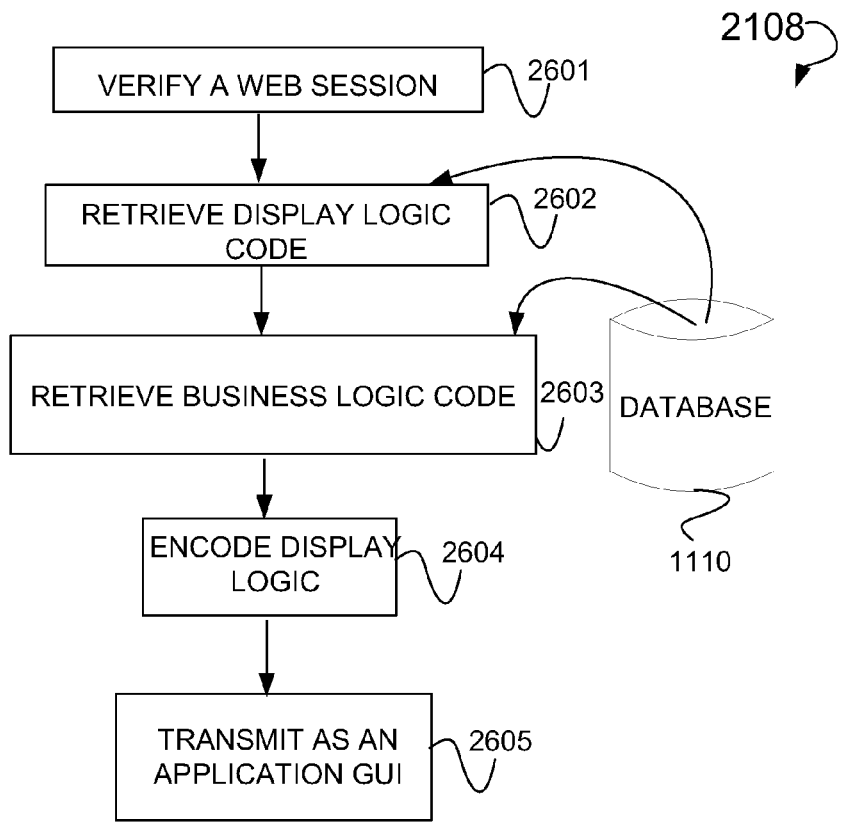
FIG. 26 is a flowchart illustrating a method used to retrieve a metadata file for an application GUI and the logic associated therewith, according to an example embodiment.

FIG. 26 is a flowchart illustrating an example method used to execute operation 2108. Illustrated is an operation 2601 that verifies a web session. Once verified, an operation 2602 is executed the retrieves display logic code from, for example, a database 1110. Further, an operation 2603 is executed that retrieves certain relevant business logic from the same database 1110. Once the display logic and business logic is retrieved, an operation 2604 is executed that encodes the display logic. Once encoded, an operation 2605 is executed that transmits this display logic as an application GUI 1111 or 2112. In some cases, this display logic may be, for example, a flash file, a JAVASCRIPT™ file, or some other file that may use a Hypertext Markup Language (HTML) to facilitate the display of data.

Example Algorithm

In some embodiments, a display area containing various layout and UI elements is rendered such that the UI elements, or containers having a plurality of UI elements, may need to be repositioned. This repositioning may be the result of truncation or available space considerations. Repositioning may result from the application of a relative percentage value approach. The relative percentage value approach can be illustrated using the following pseudo code:

```
if (resizing of display area or layout element)
    {
    While (not last UI element and not last layout element)
        {
            retrieve area of a current UI element and current layout
            element, where area is a measurement of, for example,
            pixels, or characters;
            if available space exists in current layout element and
            current layout element is of type that current UI element
            is associated with, and the percentage
            of the current layout and current UI
            allows for it, then reposition and associate the current UI
            element with the current UI element;
            else, get a new layout element and make it the current
            layout element.
        }
    }
```

In some embodiments, this algorithm determines how many columns are needed to accommodate a UI element or group of UI elements in a container. For example, if one column has available space to render a UI element, then it renders in this column. Available space may be defined as, for example, layout, and/or layout element space that a UI element may be repositioned within. This available space may represent a range of values (e.g., area, and/or height and width values), such that each type of UI element may have a particular available space value associated with it. For example, within the same available space there may be one set of ranges for UI elements in the form of radio buttons and another set of ranges for textboxes.

In some embodiments, available space may be defined in terms of proportionality (e.g., a notion of proportionality). That is, space will only be construed to be available where a UI element may be reposition such that the UI element may be rendered in a manner that meet certain requirements of proportionality. These requirements may be certain predefined mathematical ranges or limits of values set out as rules (e.g., if (UI element area>1,000 units), then no available space). For example, if the available space has an area of 10,000 units and the UI element to be repositioned takes up 10,000 units, this UI element may appear out of proportion relative to the other UI elements occupying the layout element within which space is available. This may especially be the case where, for example, the other UI elements only take up an area of 1,000 units. This lack of proportionality may result in no actual space being available.

Some embodiments may include the use of an algorithm to implement a WYSIWYG approach. Specifically, rather than using the percentage ratio of space taken up by a UI element in a layout element (see the relative percentage value approach above), static values are used to determine the association of a UI element to a layout element. These same static values may be used to determine the repositioning of the UI element in cases of truncation or available space. This WYSIWYG approach is reflecting in the following pseudo code:

```
if (resizing of display area or layout element)
    {
    While (not last UI element and not last layout element)
        {
            retrieve relative distance data of a current UI element to a
            current layout element, where distance is a measurement of,
            for example, pixels, or characters;
            if available space exists in current layout element and
            current layout element is of type that current UI
            element is associated with, and the relative
            distance of the current layout and
            current UI allows for it, then reposition and associate the
            current UI element with the current UI element;
            else, get a new layout element and make it the current
            layout element.
        }
    }
```

Example embodiments may include this algorithm to reposition a UI element within a new layout element or to otherwise associate this UI element with this new layout element. For example if available space exists such that a UI element may be positioned five characters from the top of a layout element (e.g., a column), then the UI element may be repositioned to the layout element where it may be necessary. Moreover, the description of available space provided above may be applied with equal import to the present WYSIWYG approach.

Example Database

Some embodiments may include the various databases (e.g., 1110 or 1114) being relational databases or in some cases OLAP based databases. In the case of relational databases, various tables of data are created and data is inserted into, and/or selected from these tables using a Structured Query Language (SQL) or some other database-query language known in the art. In the case of OLAP databases, one or more multi-dimensional cubes or hyper cubes, containing multidimensional data from which data is selected from or inserted into using MDX may be implemented. In the case of a database using tables and SQL, a database application such as, for example, MYSQL™, SQLSERVER™, Oracle 8I™, or 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes are made up of tables, in the case of, for example, ROLAP, and are organized into a RDS or Object Relational Data Schema (ORDS), as is known in the art. These schemas may be normalized using certain normalization algorithms to avoid abnormalities such as non-additive joins and other problems. Additionally, these normalization algorithms may include Boyce-Codd Normal Form or some other normalization, optimization algorithm known in the art.

Figure 27:
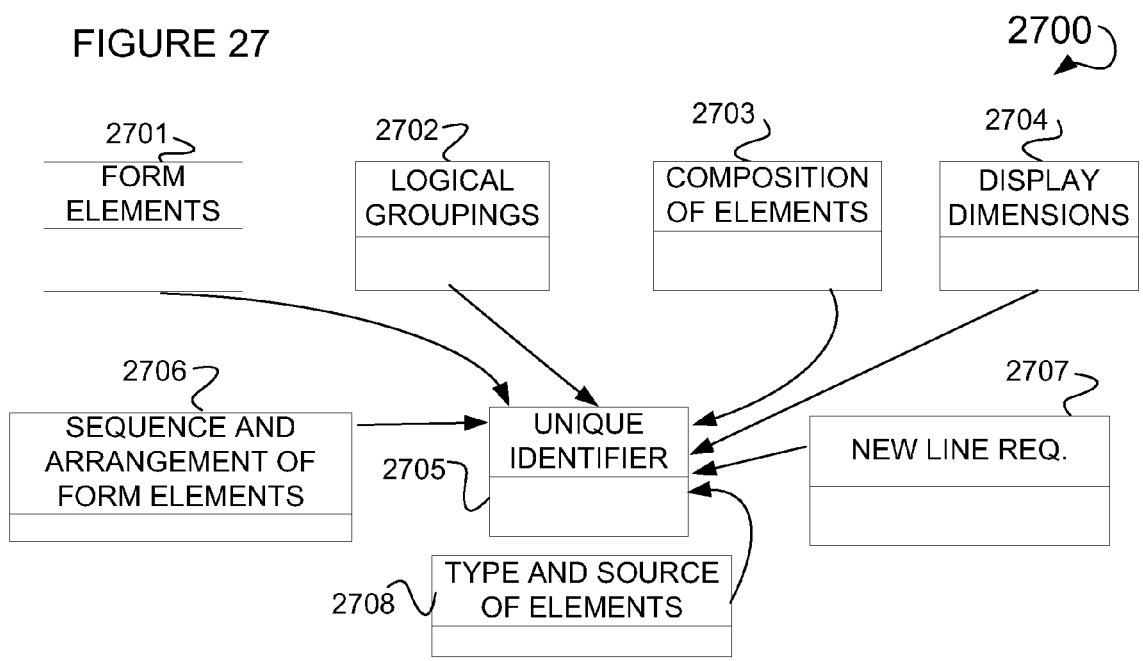
FIG. 27 is a Relational Data Schema (RDS) illustrating tables, data types, and constraints, according to an example embodiment.

FIG. 27 is an example RDS 2700. Illustrated are various database tables including, for example, a form elements table 2701. This form elements table 2701 may contain various types of form elements including, for example, UI elements, and/or layout elements that may be stored as, for example, Binary Large Objects (BLOB) or some other suitable data type. Further a table 2702 is illustrated that contains certain types of data relating to logical groupings. For example, the association data illustrating the association between a UI element and a layout element may be stored in this table as certain types of unit values contained as integer data types. Further a table 2702 may be implemented that contains the composition of certain elements where in certain cases form pane control objects may be stored as a BLOB within this table 2703. Next a display dimensions table 2704 is illustrated wherein the dimensions of particular display areas are stored as integer values reflecting certain units wherein the units represent height, width, and/or values for a particular display area. Further a table 2706 is illustrated that stores data relating to the sequence and arrangement of certain types of form elements. In certain instances the sequence of the presentation of various types of UI layout elements may be stored as, for example, various BLOBs. In some cases integers are used in lieu of or in combination with the BLOBs wherein the integer values represents certain types of pointers denoting the sequence with which a particular display area is to be rendered such that, for example, a first column will be deemed to be adjacent to a second column and the first and second column may be layered on top of, for example, a tab strip or other type of layout element. Further illustrated is a table 2707 containing data regarding a new line requirement wherein certain types of new line data stored as, for example, a BLOB, or integer. Further, table 2708 is illustrated that contains the type and source of certain types of elements wherein these elements are UI elements or layout elements. The organization of these various tables is facilitated through the use of certain types of constraint values contained within a table 2705 entitled unique identifier. These constraints may be in the form of, for example, certain types of unique numerical identification values that are used to identify a particular metadata file or used to uniquely identify a particular metadata file or metadata wherein this metadata or metadata file serves as the basis for the generation of data contained in the previously illustrated tables. In some cases, the metadata itself may be stored into a table residing as a part of the database (e.g., 1110 or 1114). This unique identifier may be a data type in the form of an integer or some other unique identifying value.

Component Design

Some example embodiments may include the above illustrated operations written as one or more software components. Common too many of these components are the ability to generate, use, and manipulate the above-illustrated UI elements and layout elements and the data associated therewith. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), or Distributed Component Object Model (DCOM) or other suitable technique. These components are linked to other components via various APIs and BAPIs and then compiled into one complete server, and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above illustrated components across a distributed programming environment. For example, a logic level may reside on a first computer system that is remotely located from a second computer system containing an interface level (e.g., a GUI). These first and second computer systems can be configured in a server-client, peer-to-peer, or some other configuration. These various levels can be written using the above illustrated component design principles and can be written in the same programming language or a different programming language. Various protocols may be implemented to enable these various levels and components contained therein, to communicate regardless of the programming language used to write these components. For example, an operation written in C++ using the Common Object Request Broker Architecture (CORBA) or Simple Object Access Protocol (SOAP) can communicate with another remote module written in JAVA™. These protocols include SOAP and CORBA or some other suitable protocol. These protocols are well-known in the art.

A Computer System

Figure 28:
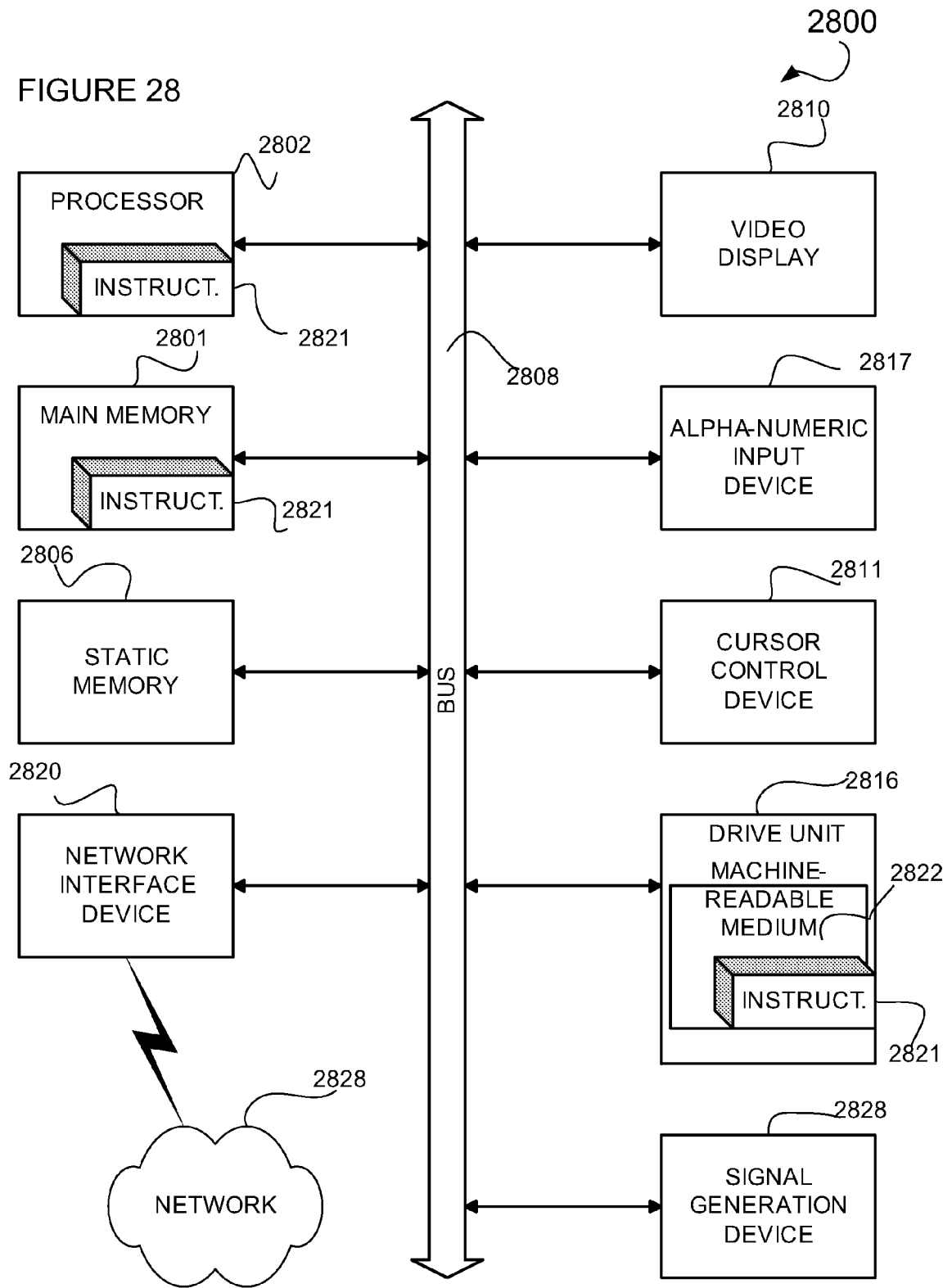
FIG. 28 shows a diagrammatic representation of a machine in the example form of a computer system, according to an example embodiment.

FIG. 28 shows a diagrammatic representation of a machine in the example form of a computer system 2800 that executes a set of instructions to perform any one or more of the methodologies discussed herein. One of the devices 1102 may configured as a computer system 2800. In alternative embodiments, the machine operates as a stand-alone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a web appliance, a network router, network switch, network bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2800 includes a method or 2802 (e.g., a Central Processing Unit (CPU), a Graphics Processing Unit (GPU) or both), a main memory 2801, and a static memory 2806 that communicate with each other via a bus 2808. The computer system 2800 may further include a video display unit 2810 (e.g., a Liquid Crystal Display (LCD) or a Cathode Ray Tube (CRT)). The computer system 2800 also includes an alphanumeric input device 2817 (e.g., a keyboard), a user interface (UI) cursor controller 2811 (e.g., a mouse), a disk drive unit 2816, a signal generation device 2828 (e.g., a speaker), and a network interface device (e.g., a transmitter) 2820.

The disk drive unit 2816 includes a machine-readable medium 2822 on which is stored one or more sets of instructions and data structures (e.g., software) embodying or used by any one or more of the methodologies or functions illustrated herein. The software may also reside, completely or at least partially, within the main memory 2801, and/or within the method or 2802 during execution thereof by the computer system 2800, the main memory 2801 and the method or 2802 also constituting machine-readable media.

The instructions 2821 may further be transmitted or received over a network 2828 via the network interface device 2820 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical media and magnetic media.

Marketplace Applications

One exemplary advantage of an embodiment of the present method and system is to allow users to apply certain principles of declarative programming in the positing or repositioning of UI elements and layout elements within the display area of a GUI. Specifically, rather than a user having to generate the display and supporting business logic to position or reposition a UI or layout element, a user may just associate the UI element and layout element such that issues relating to how to align certain UI elements within an associated layout element may be automatically addressed. For example, if a display area is expanded, than certain UI and layout elements may be automatically repositioned to fill this newly available space. If, on the other hand, the display area is reduced, then the UI and layout elements may be automatically repositioned to fill what available space may exist to accommodate these UI and layout elements. This automatic repositioning has applications where the available space within a display area may be limited (e.g., the screens of hand held devices etc.) Further, this positioning or repositioning may include the repositioning of labels associated with a UI or layout element.

The above illustrated exemplary advantage may allow a user to more efficiently and more quickly generate UIs that that can be used on a wide variety of devices, while at the same time avoiding the problem of the truncation of UI elements, or excessive available space. This may allow for UIs to be developed the more efficiently use screen space, and which have more universal applicability.

The automatic repositioning of UI elements can be extended to apply to display areas containing a plurality of layout elements layered one on top of another. For example, in cases where a tab strip container (see e.g., tab strip container 305) is used, this tab strip container 305 may have a number of layers, with each layer accessible through a separate tab. Each one of these layers may have a tab strip container containing a nested column layout element (see e.g., 304), and a number of UI elements (e.g., textboxes) may be associated with the nested column layout element. In cases where the display area is resized, the UI elements at each layer may be re-positioned such that available space is used so as to avoid truncation or available space. Rather than having to rewrite the display logic associated with this GUI and, fundamentally, the display area, the display logic may accommodate the resizing automatically.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description with each claim standing on its own as a separate embodiment.

What is claimed is:

1. A method comprising:
    configuring a layout into discrete regions defined by layout elements, the layout to form a part of a first Graphical User Interface (GUI) relating to an application;
    associating a first layout element from the layout elements with at least one User Interface (UI) element from UI elements;
    receiving, from a client system, over a network, a service request relating to the application, the service request including a first set of rendering data illustrating a display area within which the first GUI is to be displayed;
    responsive to the service request, at a server system, retrieving metadata illustrating the layout elements and the UI elements;
    generating the first GUI, using the metadata, at the server system in response to receiving, at the server system, data regarding expansion or reduction of the display area of the client system:
        determining a change in dimensions of the first layout element from the layout elements, comprising determining that at least one UI element from the UI elements occupies less than a minimum percentage or more than a maximum percentage of the total area of an associated layout element, and
        generating a second GUI by automatically repositioning the at least one UI element from the UI elements to a further layout element from the layout elements in response to the determining, the at least one UI element having a functionality facilitating user interaction with the application; and
    providing the second GUI to the client system over the network.

2. The method of claim 1, further comprising optimizing the first-GUI by automatically eliminating an empty column, the empty column being empty as a result of a change to a display area size of the display area.

3. The method of claim 1, further comprising:
    receiving a second set of rendering data, the second set of rendering data to resize the display area within which the first GUI is displayed; and
    transmitting a second GUI relating to the application, the second GUI being generated using data including the second set of rendering data.

4. The method of claim 3, wherein the second set of rendering data is to resize the display area of the first GUI to be smaller than as previously rendered, automatic repositioning of at least one of the layout elements comprising:
    shrinking horizontally an input UI until a minimum threshold value relating to the input UI is reached;
    wrapping a UI field until a minimum threshold value relating to the UI field is reached;
    reducing a form pane header until a minimum threshold value relating to the form pane header is reached; and
    forcing horizontal scrolling until a minimum threshold value relating to a field length is reached.

5. The method of claim 3, wherein the second set of rendering data is to resize the display area of the first GUI to be larger than as previously rendered, automatic repositioning of at least one of the layout elements comprising:
    expanding an input box field until a maximum threshold value relating to the input box field is reached; and
    unwrapping a UI label where it is able to render on one line.

6. A computer system comprising:
    at least one processor coupled to a memory;
    a first module to configure, using the at least one processor, a layout into discrete regions defined by layout elements, the layout to form a part of a first Graphical User Interface (GUI) relating to an application;
    a second module to associate, using the at least one processor, a first layout element from the layout elements with at least one User Interface (UI) element from UI elements;
    a first receiver to receive, using the at least one processor, from a client system, over a network, a service request relating to the application, the service request including a first set of rendering data illustrating a display area the first GUI is to be displayed;
    a first rendering engine to retrieve metadata, at a server system, using the at least one processor, responsive to the service request, and to generate the first GUI at the server system, using the metadata, the metadata illustrating the layout elements and the UI elements, the first rendering engine comprising one or more processors, the first rendering engine further being configured to, in response to receiving, at the server system, data regarding expansion or reduction of the display area of the client system:
        determine a change in dimensions of the first layout element from the layout elements, comprising determining that at least one UI element from the UI elements occupies less than a minimum percentage or more than a maximum percentage of the total area of an associated layout element, and
        generate a second GUI by automatically repositioning the at least one UI element from the UI elements to a further layout element from the layout elements in response to the determining, the at least one UI element having a functionality facilitating user interaction with the application; and
    a first transmitter to transmit the second GUI, using the at least one processor, to the client system over the network.

7. The computer system of claim 6, further comprising an optimizer to automatically optimize the first GUI by eliminating an empty column, the empty column being empty as a result of a change to a display area size of the display area.

8. The computer system of claim 6, further comprising:
    a second receiver to receive a second set of rendering data, the second set of rendering data to resize the display area within which the first GUI is displayed; and
    a second transmitter to transmit a second GUI relating to the application, the second GUI being generated using data including the second set of rendering data.

9. The computer system of claim 8, wherein the second set of rendering data is to resize the display area of the first GUI to be smaller than as previously rendered, the first rendering engine further being configured automatically to:
    shrink horizontally an input UI to a minimum threshold value relating to the input UI is reached;
    wrap a UI field until a minimum threshold value relating to a UI field is reached;
    reduce a form pane header until a minimum threshold value relating to a form pane header is reached; and
    force a horizontal scroll until a minimum threshold value relating to a field length is reached.

10. The computer system of claim 8, wherein the second set of rendering data is to resize the display area of the first GUI to be larger than as previously rendered, the first rendering engine further being configured automatically to:
    expand an input box field until a maximum threshold value relating to the input box field is reached; and
    unwrap a UI label where it is able to render on one line.

11. An apparatus comprising:
    means for configuring a layout into discrete regions defined by layout elements, the layout to form a part of a first Graphical User Interface (GUI) relating to an application;
    means for associating a first layout element from the layout elements with at least one User Interface (UI) element from UI elements;
    means for receiving, from a client system, over a network, a service request relating to the application, the service request including a first set of rendering data illustrating a display area within which the first GUI is to be displayed;
    means for, responsive to the service request, retrieving, at a server system, metadata illustrating the layout elements and the UI elements;
    means for, generating the first GUI at a server system, using the metadata; and
    means for, in response to receiving, at the server system, data regarding expansion or reduction of the display area of the client system:
        determining a change in dimensions of the first layout element from the layout elements, comprising determining that at least one UI element from the UI elements occupies less than a minimum percentage or more than a maximum percentage of the total area of an associated layout element, and
        generating a second GUI by automatically repositioning at least one UI element from the UI elements to a further layout element from the layout elements in response to the determining, the at least one UI element having a functionality facilitating user interaction with the application; and
    providing the second GUI to the client system over the network.

12. A computer-readable non-transitory storage medium embodying instructions, the instructions comprising:
    a certain instruction set to divide a layout into discrete regions defined by layout elements, the layout to form a part of a first Graphical User Interface (GUI) relating to an application;
    a further instruction set to associate a first layout element from the layout elements with at least one User Interface (UI) element from UI elements;
    a first instruction set to receive, from a client system, over a network, a service request relating to the application, the service request including a first set of rendering data illustrating a display area within which the first GUI is to be displayed;
    a second instruction set to retrieve metadata at a server system, the metadata illustrating the layout elements and the UI elements;
    a third instruction set to retrieve display logic associated with the metadata;
    a fourth instruction set to retrieve business logic associated with the metadata;
    a fifth instruction set to generate the first GUI using the metadata, at the server system; and a sixth instruction set to, in response to receiving, at the server system, data regarding expansion or reduction of the display area of the client system:
  determine a change in dimensions of the first layout element from the layout elements, comprising determining that at least one UI element from the UI elements occupies less than a minimum percentage or more than a maximum percentage of the total area of an associated layout element, and
  generate a second GUI by automatically repositioning at least one UI element from the UI elements to a further layout element from the layout elements in response to the determining, the at least one UI element having a functionality facilitating user interaction with the application; and
a seventh instruction set to provide the second GUI to the client system over the network.

13. The method of claim 1, wherein the at least one UI element is a textbox UI element capable of receiving user input.

* * * * *